(12) United States Patent
Jing et al.

(10) Patent No.: US 12,728,826 B2
(45) Date of Patent: Sep. 8, 2026

(54) BRAKE SYSTEM WITH CONTROL REDUNDANCY

(71) Applicant: Huawei Digital Power Technologies Co., Ltd., Shenzhen (CN)

(72) Inventors: Pengcheng Jing, Shanghai (CN); Yongsheng Zhang, Shanghai (CN); Chongxi Huang, Shanghai (CN); Hui Ni, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/049,115

(22) Filed: Feb. 10, 2025

(65) Prior Publication Data

US 2025/0340188 A1 Nov. 6, 2025

(30) Foreign Application Priority Data

Feb. 29, 2024 (CN) ......................... 202410233256.0

(51) Int. Cl.
*B60T 8/172* (2006.01)
*B60T 8/171* (2006.01)

(52) U.S. Cl.
CPC .............. *B60T 8/172* (2013.01); *B60T 8/171* (2013.01); *B60T 2220/04* (2013.01); (Continued)

(58) Field of Classification Search
CPC ...... B60T 8/172; B60T 8/171; B60T 2220/04; B60T 2270/402; B60T 2270/406; B60T 2270/413; B60T 2270/414; B60T 1/065; B60T 13/686; B60T 2270/404; B60T 2270/82; B60T 8/3255; B60T 8/885; B60T 13/662; B60T 13/741; B60T 17/22; B60T 7/042; B60T 13/74; B60T 17/18; F16D 2066/005; F16D 2121/02; F16D 2121/24;
(Continued)

(56) References Cited

U.S. PATENT DOCUMENTS 6,476,515 B1 11/2002 Yamamoto et al.
7,826,952 B2 11/2010 Disser et al.
(Continued)

FOREIGN PATENT DOCUMENTS

CN 102490705 A 6/2012
CN 109552280 A 4/2019
(Continued)

*Primary Examiner* — Xiao En Mo
(74) *Attorney, Agent, or Firm* — Maier & Maier, PLLC

(57) ABSTRACT

A brake system with control redundancy includes a central controller and four wheel end brake apparatuses. The central controller receives one channel of brake pedal travel signal and one channel of brake pedal force signal. A wheel end controller is configured to receive the other channel of brake pedal travel signal and the other channel of brake pedal force signal. One of the sensors fails, and the other sensor can still detect a motion state of a brake pedal, to improve operational reliability of the brake system with control redundancy. In addition, even when the central controller fails, the four wheel end brake apparatuses can be controlled, based on the other channel of brake pedal travel signal and the other channel of brake pedal force signal, to output brake forces.

20 Claims, 18 Drawing Sheets

(52) U.S. Cl.
CPC ... *B60T 2270/402* (2013.01); *B60T 2270/406* (2013.01); *B60T 2270/413* (2013.01); *B60T 2270/414* (2013.01)

(58) Field of Classification Search
CPC ............ F16D 65/183; F16D 2066/003; B60W 50/023; B60L 15/2009
See application file for complete search history.

(56) References Cited

U.S. PATENT DOCUMENTS

| | | | |
|---|---|---|---|
| 2001/0035679 A1 | 11/2001 | Riddiford et al. | |
| 2018/0050670 A1* | 2/2018 | Feigel | B60T 13/662 |
| 2022/0340118 A1* | 10/2022 | Meyer | B60T 13/741 |
| 2023/0192048 A1 | 6/2023 | Moon et al. | |
| 2025/0282335 A1* | 9/2025 | Li | B60T 7/042 |

FOREIGN PATENT DOCUMENTS

| | | | |
|---|---|---|---|
| CN | 115107722 | A | 9/2022 |
| CN | 217945163 | U | 12/2022 |
| DE | 102005008681 | A1 | 1/2007 |
| WO | 2014026522 | A1 | 2/2014 |

* cited by examiner

BRAKE SYSTEM WITH CONTROL REDUNDANCY

CROSS-REFERENCE TO RELATED APPLICATIONS

This application claims priority to Chinese Patent Application No. 202410233256.0, filed on Feb. 29, 2024, which is hereby incorporated by reference in its entirety.

TECHNICAL FIELD

The embodiments relate to the field of electric vehicle braking, and to a brake system with control redundancy.

BACKGROUND

An electromechanical brake system develops rapidly due to advantages of a fast response speed and high control precision. However, use of an electrical signal for control has a higher requirement for functional safety of the electromechanical brake system. However, most electric vehicles in the current market are equipped with only one set of brake-by-wire system. If only one set of brake-by-wire system is equipped, a driving risk of a vehicle is increased. If a brake pedal or another component such as a controller in the electronic brake system is faulty, a cause of the fault cannot be determined, and a brake failure may be further caused. Consequently, a great safety risk is caused to normal safe driving of the electric vehicle.

SUMMARY

The embodiments provide an electromechanical brake system with control redundancy and an electric vehicle, to resolve a brake failure caused by a failure in a single point of a brake pedal travel sensor, a brake pedal force sensor, or a central controller of the electromechanical brake system, to improve operational reliability and safety of the electromechanical brake system.

According to a first aspect, the embodiments provide a brake system with control redundancy. The brake system with control redundancy includes a central controller and four wheel end brake apparatuses, and each wheel end brake apparatus includes a wheel end controller and a brake actuator. The wheel end controller is configured to control the brake actuator to output a brake force to a brake disc of an electric vehicle. The central controller is configured to receive one channel of brake pedal travel signal from the brake pedal travel sensor and one channel of brake pedal force signal from the brake pedal force sensor. One of the four wheel end controllers is configured to receive the other channel of brake pedal travel signal from the brake pedal travel sensor and the other channel of brake pedal force signal from the brake pedal force sensor. The channel of brake pedal travel signal and the other channel of brake pedal travel signal indicate a travel of a brake pedal, and the channel of brake pedal force signal and the other channel of brake pedal force signal indicate a force acting on the brake pedal.

The brake system with control redundancy provided in the embodiments is configured to receive sensor signals sent by the brake pedal travel sensor and the brake pedal force sensor that are in backup with each other. The brake pedal travel sensor and the brake pedal force sensor can detect a motion state of the brake pedal more accurately. If one sensor fails, the other sensor can still independently detect the motion state of the brake pedal, to improve operational reliability of the brake system with control redundancy. In addition, both the brake pedal travel sensor and the brake pedal force sensor are connected to the central controller and a wheel end controller at the same time. Therefore, even when the central controller fails, the wheel end controller can also control, based on the other channel of brake pedal travel signal and the other channel of brake pedal force signal, the four wheel end brake apparatuses to output brake forces, to avoid a failure of the entire brake system with control redundancy caused by the failure of the central controller, and improve safety and reliability of the brake system.

In a possible implementation, a brake force corresponding to the channel of brake pedal travel signal is a first brake force, a brake force corresponding to the other channel of brake pedal travel signal is a second brake force, a brake force corresponding to the channel of brake pedal force signal is a third brake force, a brake force corresponding to the other channel of brake pedal force signal is a fourth brake force.

The central controller can determine the brake force corresponding to the channel of brake pedal travel signal as the first brake force based on the channel of brake pedal travel signal, and determine the brake force corresponding to the channel of brake pedal force signal as the second brake force based on the channel of brake pedal force signal. The wheel end controller can determine the brake force corresponding to the other channel of brake pedal travel signal as the third brake force based on the other channel of brake pedal travel signal, and determine the brake force corresponding to the other channel of brake pedal force signal as the fourth brake force based on the other channel of brake pedal force signal.

In a possible implementation, during braking of the vehicle, the central controller is configured to: in response to both the brake pedal travel sensor and the brake pedal force sensor being active, control, based on a larger value in the first brake force and the second brake force, the four wheel end brake apparatuses to output brake forces, or control, based on a largest value in the first brake force, the second brake force, the third brake force, and the fourth brake force, the four wheel end brake apparatuses to output brake forces.

When the brake pedal travel sensor, the brake pedal force sensor, and the central controller are all normal, the brake system with control redundancy is in a normal working mode. The central controller controls, based on a larger value in the first brake force and the second brake force, the four wheel end brake apparatuses to output brake forces, to improve brake accuracy during braking. In addition, the central controller may alternatively control, based on a largest value in the first brake force, the second brake force, the third brake force, and the fourth brake force, the four wheel end brake apparatuses to output brake forces, to ensure brake safety of the vehicle.

In a possible implementation, the central controller is configured to: in response to the brake pedal travel sensor being active and the brake pedal force sensor failing, control, based on the first brake force, the four wheel end brake apparatuses to output brake forces; or in response to the brake pedal travel sensor failing and the brake pedal force sensor being active, control, based on the third brake force, the four wheel end brake apparatuses to output brake forces.

When the brake pedal force sensor fails, the two channels of brake pedal force signals both fail, and the central controller controls, based on the first brake force corresponding to the channel of brake pedal travel signal, the four wheel end brake apparatuses to output brake forces. When the brake pedal travel sensor fails, the two channels of brake pedal travel signals both fail, and the central controller controls, based on the second brake force corresponding to the channel of brake pedal force signal, the four wheel end brake apparatuses to output brake forces.

In a possible implementation, the central controller is configured to: in response to a difference between the first brake force and the third brake force being greater than a preset threshold, output a first failure signal, where the first failure signal indicates that the brake pedal travel sensor fails; or in response to a difference between the second brake force and the fourth brake force being greater than a preset threshold, output a second failure signal, where the second failure signal indicates that the brake pedal force sensor fails.

When the brake pedal travel sensor works normally, the first brake force corresponding to the channel of brake pedal travel signal and the third brake force corresponding to the other channel of brake pedal travel signal should be basically the same. However, if a difference between the first brake force and the third brake force is greater than the preset threshold, it can be determined that the brake pedal travel sensor fails. When the brake pedal force sensor works normally, the second brake force corresponding to the channel of brake pedal travel signal and the fourth brake force corresponding to the other channel of brake pedal force signal should be basically the same. However, if a difference between the second brake force and the fourth brake force is greater than the preset threshold, it can be determined that the brake pedal force sensor fails.

In a possible implementation, the central controller is configured to: in response to a difference between the first brake force and the third brake force being greater than a preset threshold, control, based on a larger value in the second brake force and the fourth brake force, the four wheel end brake apparatuses to output brake forces; or in response to a difference between the second brake force and the fourth brake force being greater than a preset threshold, control, based on a larger value in the first brake force and the third brake force, the four wheel end brake apparatuses to output brake forces.

When the brake pedal travel sensor fails, the central controller can control, based on a larger value in the second brake force and the fourth brake force, the four wheel end brake apparatuses to output brake forces. When the brake pedal force sensor fails, the central controller can control, based on a larger value in the first brake force and the third brake force, the four wheel end brake apparatuses to output brake forces, to ensure brake safety.

In a possible implementation, during braking of the vehicle, one of the four wheel end controllers is configured to: in response to the central controller failing and both the brake pedal travel sensor and the brake pedal force sensor being active, control, based on a larger value in the third brake force and the fourth brake force, the four wheel end brake apparatuses to output brake forces.

In a possible implementation, one of the four wheel end controllers is configured to: in response to the central controller and the brake pedal force sensor failing, control, based on the brake pedal travel signal, the four wheel end brake apparatuses to output brake forces; or in response to the central controller and the brake pedal travel sensor failing, control, based on the brake pedal force signal, the four wheel end brake apparatuses to output brake forces.

When the central controller fails, a first wheel end controller controls, based on a larger value in the third brake force corresponding to the other channel of brake pedal travel signal and the fourth brake force corresponding to the other channel of brake pedal force signal, the four wheel end brake apparatuses to output brake forces, to ensure that the vehicle completes braking.

In a possible implementation, the central controller is configured to: in response to both the brake pedal travel sensor and the brake pedal force sensor failing, control the four wheel end brake apparatuses to output fixed brake forces.

When the brake pedal travel sensor and the brake pedal force sensor both fail, it is difficult to determine, based on a travel of the brake pedal, brake forces that the four wheel end brake apparatuses need to be controlled to output. In this case, the central controller controls the wheel end brake apparatuses to output large fixed brake forces, to ensure brake safety.

In a possible implementation, another wheel end controller other than the wheel end controller in the four wheel end controllers is configured to: in response to both the central controller and the wheel end controller failing, control the four wheel end brake apparatuses to output fixed brake forces.

When the brake pedal travel sensor, the brake pedal force sensor, and the central controller all fail, it is difficult to determine, based on a travel of the brake pedal, brake forces that the four wheel end brake apparatuses need to be controlled to output. In this case, the wheel end controller controls the wheel end brake apparatuses to output large fixed brake forces, to ensure brake safety.

In a possible implementation, the central controller is configured to: in response to a brake pedal travel variation indicated by the channel of brake pedal travel signal being less than a preset travel and a force that acts on the brake pedal and that is indicated by the channel of brake pedal force signal being greater than a preset force, control, based on an indication of the brake pedal force signal, the four wheel end brake apparatuses to output brake forces.

When the brake pedal is stuck in a position, a brake pedal travel detected by the brake pedal travel sensor does not change. Therefore, the channel of brake pedal travel signal does not change. In this case, a driver still steps on the brake pedal force sensor, and the brake pedal force sensor detects that the force acting on the brake pedal changes. Therefore, when the brake pedal travel variation indicated by the channel of brake pedal travel signal is less than the preset travel, and the force that acts on the brake pedal and that is indicated by the channel of brake pedal force signal is greater than the preset force, it can be determined that the brake pedal is in a seized state. The central controller may control, based on an indication of the brake pedal force signal, the four wheel end brake apparatuses to output brake forces, to avoid a safety hazard and improve driving safety.

In a possible implementation, one of the four wheel end controllers is configured to: in response to a brake pedal travel variation indicated by the other channel of brake pedal travel signal being less than the preset travel and a force that acts on the brake pedal and that is indicated by the other channel of brake pedal force signal being greater than the preset force, control, based on an indication of the brake pedal force signal, the four wheel end brake apparatuses to output brake forces.

The wheel end controller can also determine that the brake pedal is in a seized state when the brake pedal travel variation indicated by the channel of brake pedal travel signal is less than the preset travel and the force that acts on the brake pedal and that is indicated by the channel of brake pedal force signal is greater than the preset force. The central controller may control, based on an indication of the brake pedal force signal, the four wheel end brake apparatuses to output brake forces, to avoid a safety hazard and improve driving safety.

In a possible implementation, the brake pedal travel sensor is configured to receive one channel of first direct current from the central controller and the other channel of first direct current from the wheel end controller, and the brake pedal force sensor is configured to receive one channel of second direct current from the wheel end controller.

In a possible implementation, the central controller includes a first power supply unit, and the first power supply unit is configured to provide the channel of first direct current for the brake pedal travel sensor. The central controller is configured to: in response to the first power supply unit failing, control, based on the second brake force, the four wheel end brake apparatuses to output brake forces, or control, based on a largest value in the second brake force, the third brake force, and the fourth brake force, the four wheel end brake apparatuses to output brake forces.

When the first power supply unit in the central controller fails, the channel of brake pedal travel signal originally sent to the central controller cannot be sent because one channel of power supply to the brake pedal travel sensor is lost. The central controller controls, based on the second brake force corresponding to the channel of brake pedal force signal, the four wheel end brake apparatuses to output brake forces. The central controller controls, based on a largest value in the second brake force, the third brake force, and the fourth brake force, the four wheel end brake apparatuses to output brake forces, to ensure that braking of the vehicle can also be normally completed when one channel of power supply to the brake pedal travel sensor is lost.

In a possible implementation, the wheel end controller includes a second power supply unit and a third power supply unit, the second power supply unit is configured to provide the other channel of first direct current for the brake pedal travel sensor, and the third power supply unit is configured to provide the channel of second direct current for the brake pedal force sensor. The wheel end controller is configured to: in response to the central controller failing and the second power supply unit failing, control, based on the fourth brake force, the four wheel end brake apparatuses to output brake forces; or in response to the central controller failing and the third power supply unit failing, control, based on the third brake force, the four wheel end brake apparatuses to output brake forces.

When the second power supply unit in the central controller fails, the other channel of brake pedal travel signal originally sent to the wheel end controller cannot be sent because the other channel of power supply to the brake pedal travel sensor is lost. The central controller controls, based on a largest value in the first brake force, the second brake force, and the fourth brake force, the four wheel end brake apparatuses to output brake forces, to ensure that braking of the vehicle can also be normally completed when one channel of power supply to the brake pedal travel sensor is lost. When the third power supply unit fails, the brake pedal force sensor (PFS) cannot send the two channels of brake pedal force signals. The central controller can control, based on the first brake force corresponding to the channel of brake pedal travel signal and the third brake force corresponding to the other channel of brake pedal travel signal, the four wheel end brake apparatuses to output brake forces.

According to a second aspect, the embodiments provide a brake system with control redundancy. The brake system with control redundancy includes a central controller and four wheel end brake apparatuses, and each wheel end brake apparatus includes a wheel end controller and a brake actuator. The wheel end controller is configured to control the brake actuator to output a brake force to a brake disc of a vehicle. The central controller is configured to receive two channels of brake pedal travel signals from a brake pedal travel sensor. One of the four wheel end controllers is configured to receive two channels of brake pedal force signals from a brake pedal force sensor. The two channels of brake pedal travel signals indicate a travel of a brake pedal, and the two channels of brake pedal force signals indicate a force acting on the brake pedal.

In a possible implementation, brake forces corresponding to the two channels of brake pedal travel signals are a first brake force and a second brake force, and brake forces corresponding to the two channels of brake pedal force signals are a third brake force and a fourth brake force.

In a possible implementation, during braking of the vehicle, the central controller is configured to: in response to both the brake pedal travel sensor and the brake pedal force sensor being active, control, based on a larger value in the first brake force and the second brake force, the four wheel end brake apparatuses to output brake forces, or control, based on a largest value in the first brake force, the second brake force, the third brake force, and the fourth brake force, the four wheel end brake apparatuses to output brake forces.

In a possible implementation, the central controller is configured to: in response to the brake pedal travel sensor being active and the brake pedal force sensor failing, control, based on a larger value in the first brake force and the second brake force, the four wheel end brake apparatuses to output brake forces; or in response to the brake pedal travel sensor failing and the brake pedal force sensor being active, control, based on a larger value in the third brake force and the fourth brake force, the four wheel end brake apparatuses to output brake forces.

In a possible implementation, during braking of the vehicle, one of the four wheel end controllers is configured to: in response to the central controller failing, control, based on a larger value in the third brake force and the fourth brake force, the four wheel end brake apparatuses to output brake forces.

DETAILED DESCRIPTION OF EMBODIMENTS

Terms used in the following embodiments are merely intended to describe specific embodiments, but are not intended as limiting. The terms "a/an", "one", "said", "the above", "the", and "this" of singular forms used in the embodiments are also intended to include expressions such as "one or more", unless otherwise specified in the context clearly.

Reference to "an embodiment", "some embodiments", or the like indicates that one or more embodiments include a specific feature, structure, or characteristic described with reference to the embodiment. Therefore, statements "in an embodiment", "in some embodiments", "in some other embodiments", "in still some other embodiments", and the like in different parts of the descriptions unnecessarily reference a same embodiment, but mean "one or more embodiments but not all embodiments", unless otherwise specified particularly. Terms "include", "comprise", "have", and variants thereof all mean "including, but not limited to", unless otherwise specified particularly.

An electromechanical brake system has many advantages, such as, but not limited to, compact layout and quick response, and has become a main direction for future technology development. However, the electromechanical brake system eliminates hydraulic connection and uses electrical signal transmission, and therefore has a higher requirement for functional safety. Currently, most autonomous driving vehicles in the current market are equipped with only one set of electromechanical brake system. If only one set of electromechanical brake system is equipped, a driving risk of vehicle is increased. If a brake pedal or another component such as a controller in the electronic brake system is faulty, a cause of the fault cannot be determined, and a brake failure is caused. Consequently, a great safety risk is caused to normal safe driving of the electric vehicle.

Based on the foregoing problem, the embodiments provide an electromechanical brake system with control redundancy and an electric vehicle.

Figure 1:
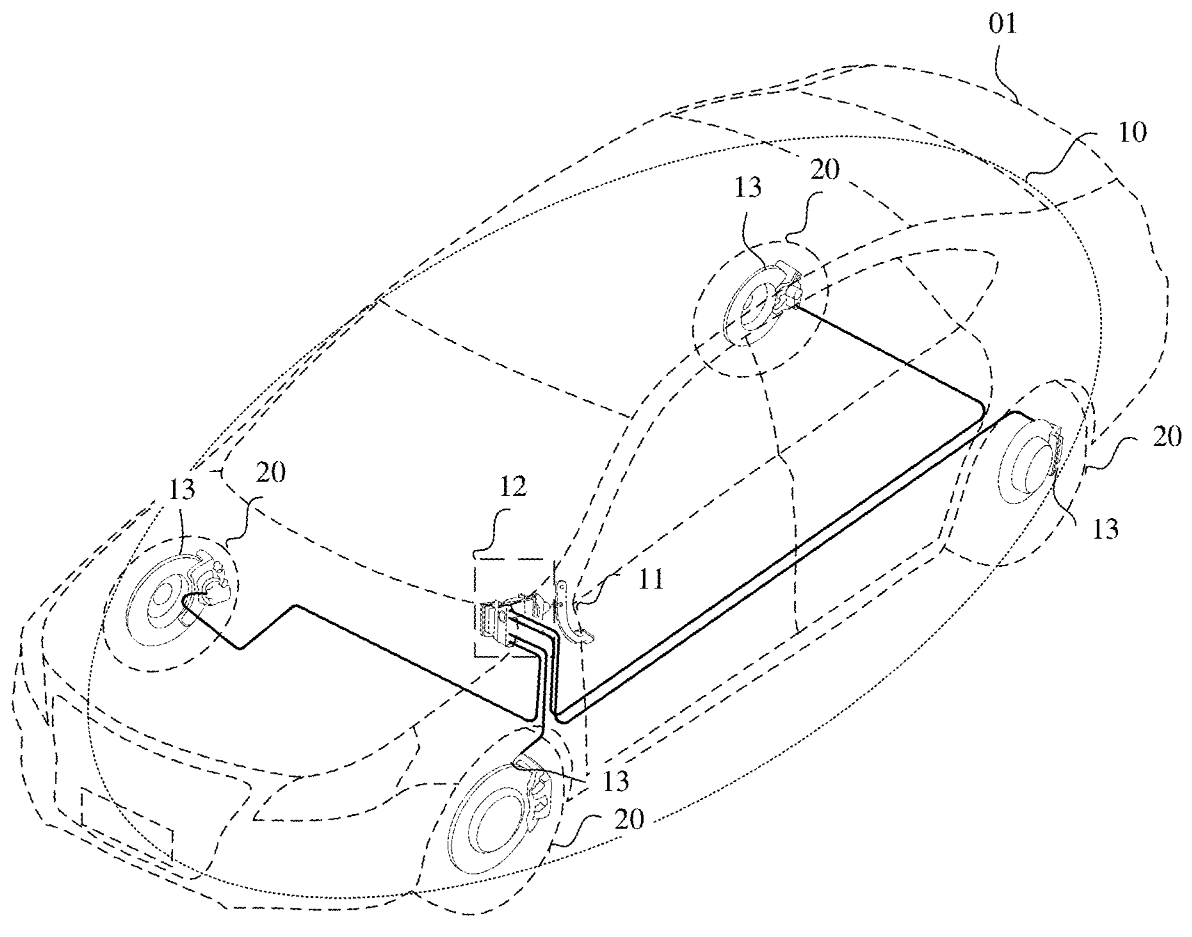
FIG. 1 is a diagram of a scenario of an electric vehicle according to an embodiment.

FIG. 1 is a diagram of a scenario of an electric vehicle according to an embodiment. Refer to FIG. 1. An electric vehicle 01 includes an electromechanical brake system 10 and four wheels 20. During braking of the electric vehicle 01, the electromechanical brake system 10 provides brake forces for the four wheels 20 based on a motion state of a brake pedal 11. The electromechanical brake system includes a central controller 12 and four wheel end brake apparatuses 13.

Figure 2:
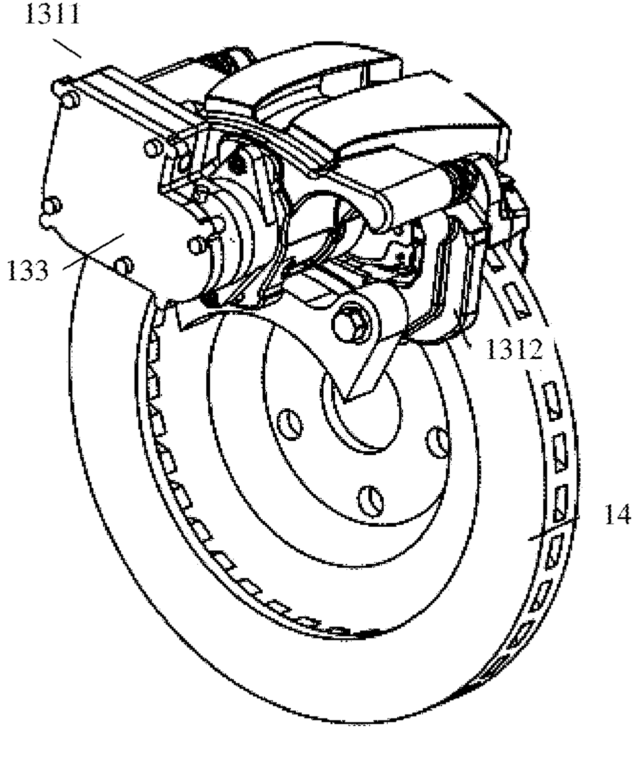
FIG. 2 is a diagram of a structure of a wheel end brake apparatus according to an embodiment.

FIG. 2 is a diagram of a structure of a wheel end brake apparatus according to an embodiment. As shown in FIG. 2, the wheel end brake apparatus 13 includes a brake actuator 131 and a wheel end controller 133. The brake actuator 131 includes a brake motor 1311 and a brake caliper 1312. During braking of the electric vehicle 01, the wheel end controller 133 controls the brake motor 1311 to drive the brake caliper 1312 to clamp a brake disc 14 of the electric vehicle, to provide a brake force for the electric vehicle 01. A specific structure of the wheel end brake apparatus 13 is not limited to the structure shown in FIG. 2, and may alternatively be another possible structure.

Figure 3:
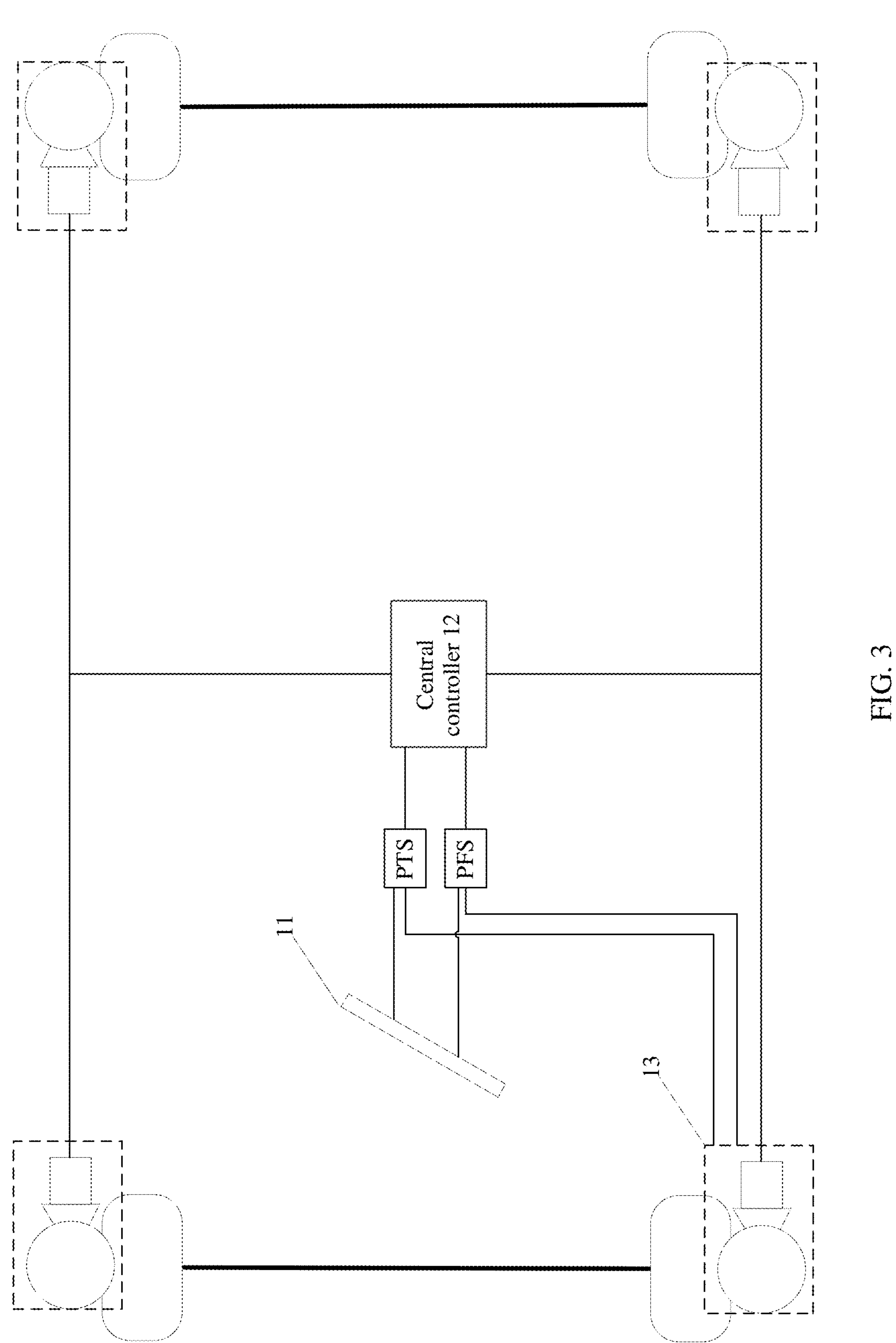
FIG. 3 is a diagram of a brake system with control redundancy according to an embodiment.

FIG. 3 is a diagram of a brake system 300 with control redundancy according to an embodiment. As shown in FIG. 3, the central controller 12 is separately connected to a brake pedal travel sensor (PTS) and a brake pedal force sensor. One of the four wheel end controllers 133 is also separately connected to the brake pedal travel sensor and the brake pedal force sensor (PFS). The brake pedal travel sensor is configured to output two channels of brake pedal travel signals, and the brake pedal force sensor is configured to output two channels of brake pedal force signals. The central controller 12 is configured to receive one channel of brake pedal travel signal from the brake pedal travel sensor and one channel of brake pedal force signal from the brake pedal force sensor. One of the four wheel end controllers 133 is configured to receive the other channel of brake pedal travel signal from the brake pedal travel sensor and the other channel of brake pedal force signal from the brake pedal force sensor. The channel of brake pedal travel signal and the other channel of brake pedal travel signal indicate a travel of the brake pedal 11, and the channel of brake pedal force signal and the other channel of brake pedal force signal indicate a force acting on the brake pedal 11.

One of the four wheel end controllers 133 is not a specific one of the four wheel end controllers 133, but may be any one of the four wheel end controllers 133.

The brake pedal travel sensor is configured to monitor a travel distance of the brake pedal 11. The central controller 12 and one of the four wheel end controllers 133 obtain a brake force requirement of the electric vehicle 01 based on the travel distance of the brake pedal 11 from the first brake pedal sensor. The brake pedal force sensor is configured to monitor the force acting on the brake pedal 11. The central controller 12 and one of the four wheel end controllers 133 obtain a brake force requirement of the electric vehicle 01 based on the force acting on the brake pedal 11, or determine a corresponding travel distance based on the force acting on the brake pedal 11, and then obtain the brake force requirement of the electric vehicle 01 based on the travel distance of the brake pedal 11.

In addition, the brake system 300 with control redundancy may further include another type of sensor, and the another type of sensor also monitors a motion state of the brake pedal 11. Details are not described herein.

The brake pedal travel sensor and the brake pedal force sensor in the brake system 300 with control redundancy provided in the embodiments are in backup with each other. The two different types of brake pedal sensors can detect a motion state of the brake pedal 11 more accurately. In addition, if one of the brake pedal travel sensor and the brake pedal force sensor fails, the other one can still independently detect the motion state of the brake pedal 11, to improve operational reliability of the brake system 300 with control redundancy. In addition, the brake pedal travel sensor and the brake pedal force sensor jointly detect the motion state of the brake pedal 11, so that whether the brake pedal 11 is seized and fails can be learned in a timely manner, to avoid a safety problem caused by the seized pedal.

In addition, the central controller 12 and one of the four wheel end controllers 133 may be mutually redundant controllers. In other words, when the central controller 12 fails, one of the four wheel end controllers 133 continues to control the four wheel end brake apparatuses 13 to output brake forces, to avoid a failure of the entire brake system 300 with control redundancy caused by the failure of the central controller 12, and improve security and reliability of the brake system 300 with control redundancy.

Figure 4:
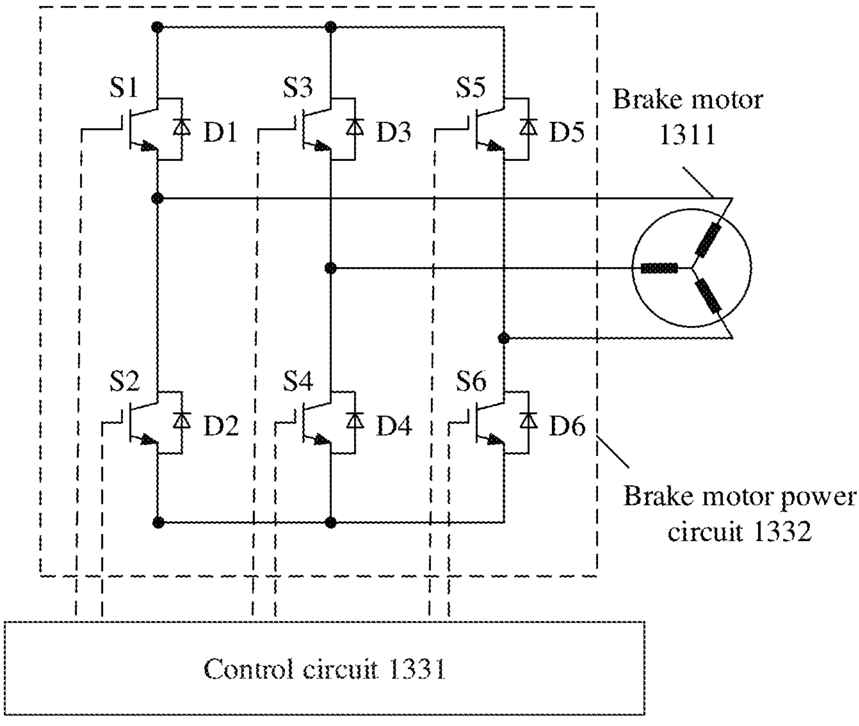
FIG. 4 is a diagram of a structure of a wheel end controller according to an embodiment.

FIG. 4 is a diagram of a structure of a wheel end controller 133 according to an embodiment. As shown in FIG. 4, the wheel end controller 133 includes a control circuit 1331 and a brake motor power circuit 1332. The brake motor power circuit 1332 includes a three-phase bridge arm. The brake motor 1311 includes a three-phase winding. Neutral points of the three-phase bridge arm of the brake motor power circuit 1332 each are connected to the three-phase winding of the brake motor 1311. The control circuit 1331 is configured to control the brake motor power circuit 1332 to output a brake motor drive current to the three-phase winding of the brake motor 1311. The brake motor drive current is used to control the brake motor 1311 to drive the brake caliper 1312 to clamp the brake disc 14.

Figure 5:
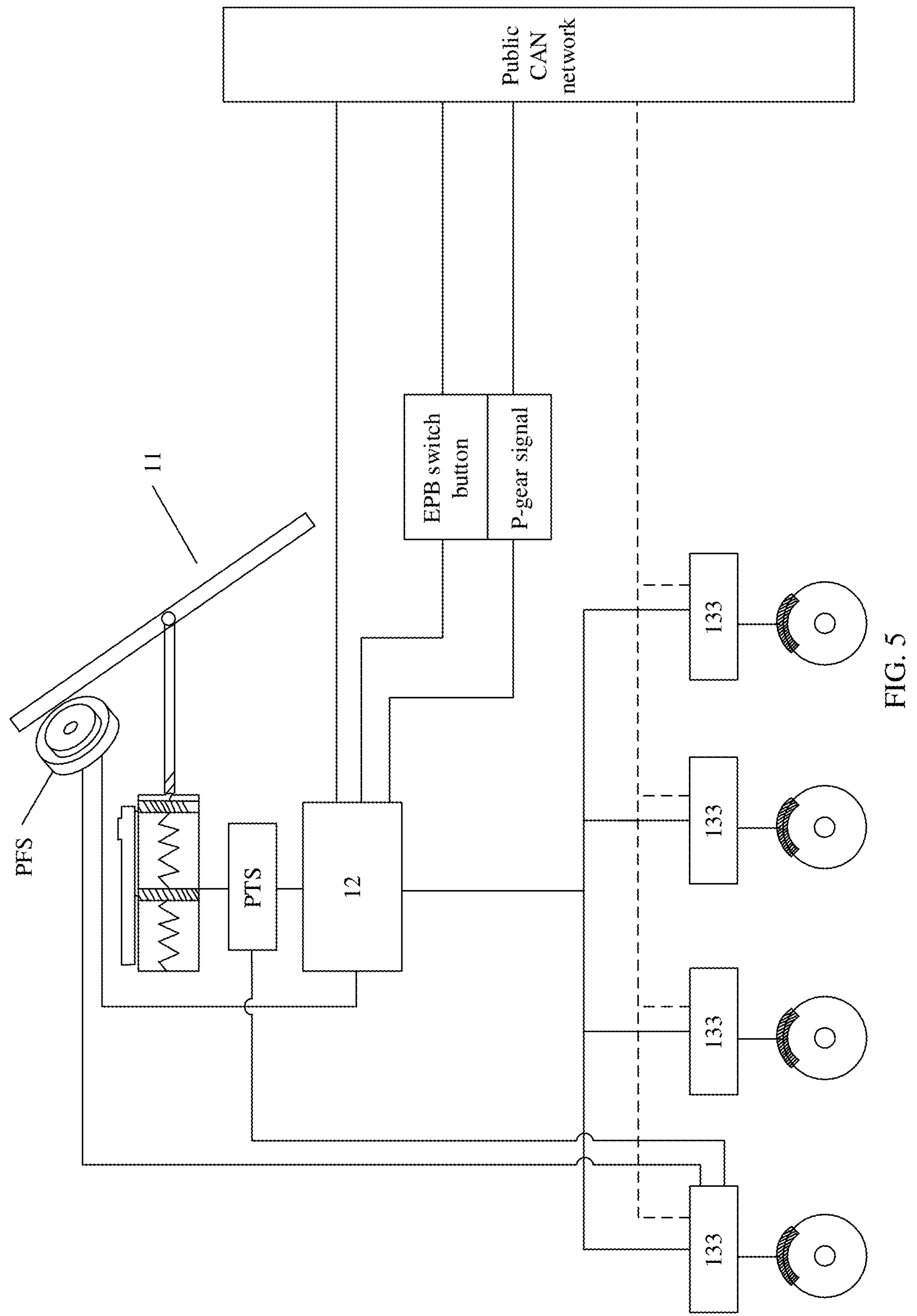
FIG. 5 is a diagram 1 of a communication control architecture of a brake system with control redundancy.
Figure 6:
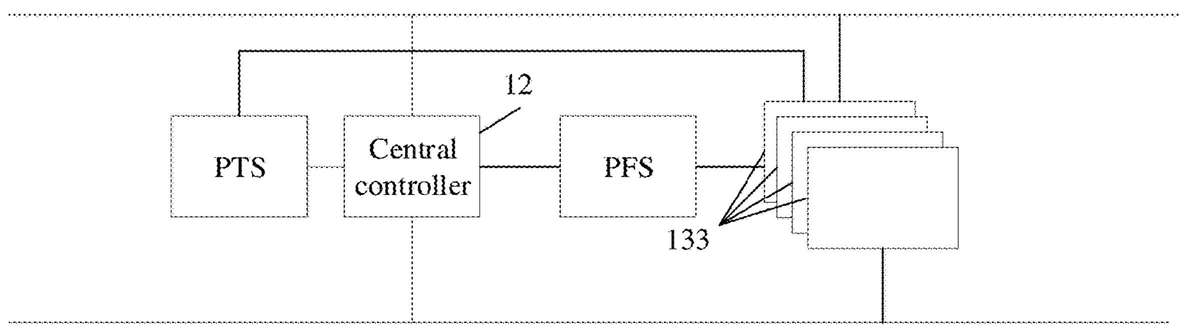
FIG. 6 is a diagram 2 of a communication control architecture of a brake system with control redundancy.

FIG. 5 and FIG. 6 further provide diagrams of a communication control architecture of the brake system 300 with control redundancy. As shown in FIG. 5 and FIG. 6, the central controller 12 is connected to a public controller area network (CAN) of the electric vehicle 01, and the central controller 12 may communicate with another controller of the electric vehicle through the public CAN network. For example, the central controller 12 communicates with a vehicle control unit (VCU), and for an electric vehicle with an energy recovery function, may calculate a required energy recovery intensity of the electric vehicle by interaction between the vehicle control unit and the brake system 300 with control redundancy.

The four wheel end controllers 133 are also connected to the public CAN network. The four wheel end controllers 133 each may communicate with another controller of the electric vehicle through the public CAN network, for example, an autonomous driving controller, a motion domain controller, and the vehicle control unit.

The four wheel end controllers 133 communicate with the central controller 12 through a chassis private CAN network. The chassis private CAN is a communication bus can be used for a chassis system, and connects various sensors and actuators and transmits data between various sensors and actuators in the chassis system, to implement dynamic control of the electric vehicle 01 and ensure safety of the electric vehicle 01. Therefore, the central controller 12 may obtain, from one of the four wheel end controllers 133 through the private CAN network, the other channel of brake pedal travel signal from the brake pedal travel sensor and the other channel of brake pedal force signal from the brake pedal force sensor one of the four wheel end controllers 133 may also obtain, from the central controller 12 through the private CAN network, the channel of brake pedal travel signal from the brake pedal travel sensor and the channel of brake pedal force signal from the brake pedal force sensor.

The central controller 12 may send a brake control signal to the wheel end controller 133 through the chassis private CAN network, to control the wheel end brake apparatus 13 to output a brake force. In addition, the four wheel end controllers 133 may also send state signals of the wheel end brake apparatuses 13 to the central controller 12 through the chassis private CAN network, for example, a current temperature of the brake motor 1311, a torque currently output by the brake motor 1311, and a clamping force state signal output by the brake caliper 1312. The four wheel end controllers 133 may also communicate with each other through the chassis private CAN network.

Figure 7:
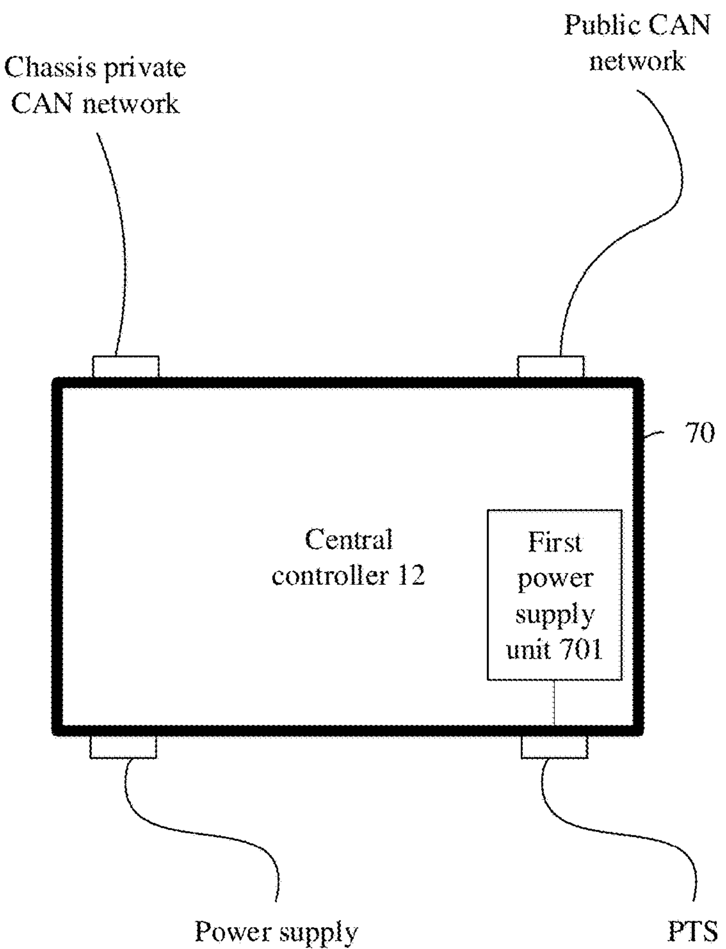
FIG. 7 is a diagram of a structure of a central controller.

The central controller 12 includes a first housing 70 and a first power supply unit 701. A structure of the first housing 70 of the central controller 12 is shown in FIG. 7. The first housing 70 includes a first public CAN communication interface, a first private CAN communication interface, and a first power supply interface. The central controller 12 may communicate with the public CAN network and another controller of the electric vehicle 01 through the first public CAN communication interface. The central controller 12 sends signals to the four wheel end controllers 133 through the first private CAN communication interface, or receives signals from the four wheel end brake apparatuses 13 through the private CAN communication interface. The first power supply unit 701 is configured to provide one channel of first direct current for the brake pedal travel sensor through the first power supply interface. In addition, the first housing 70 further includes a first power interface, and the central controller 12 receives power supply through the first power interface.

Figure 8:
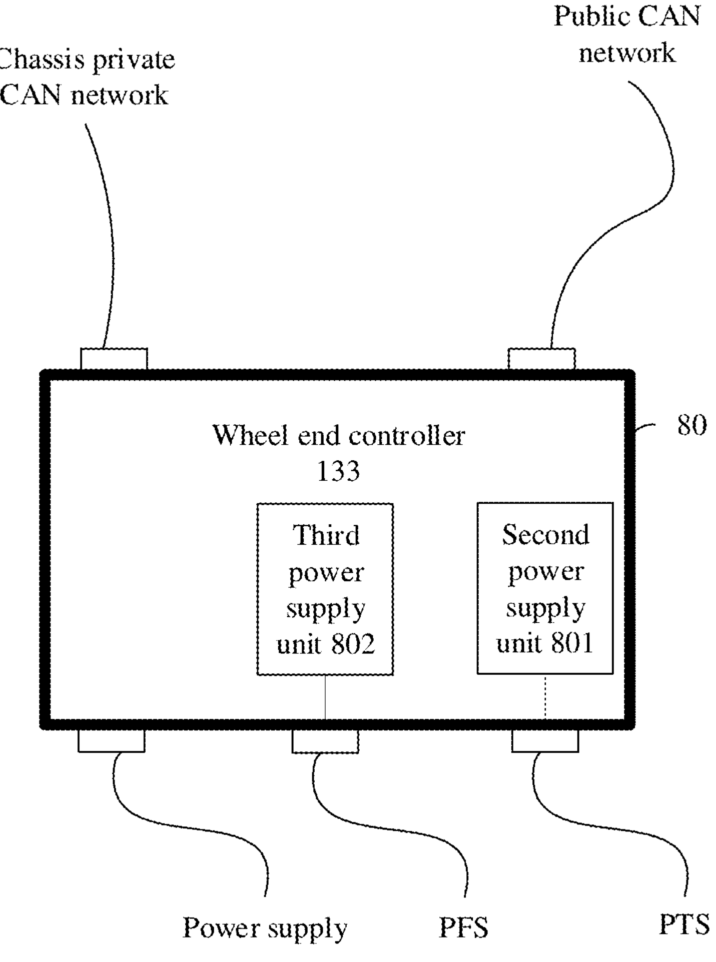
FIG. 8 is a diagram of a structure of a wheel end controller.

One of the four wheel end controllers 133 includes a second housing 80, a second power supply unit 801, and a third power supply unit 802. A structure of the second housing 80 is shown in FIG. 8. The second housing 80 includes a second public CAN communication interface, a second private CAN communication interface, a second power supply interface, and a third power supply interface. The wheel end controller 133 may communicate with the public CAN network and another controller of the electric vehicle 01 through the second public CAN communication interface. The wheel end controller 133 sends a signal to the central controller 12 through the second private CAN communication interface, or receives a signal from another wheel end brake apparatus 13 through the private CAN communication interface. The second power supply unit 801 provides the other channel of first direct current for the brake pedal travel sensor through the second power supply interface. The third power supply unit 802 provides one channel of second direct current for the brake pedal force sensor through the second power supply interface. In addition, the second housing 80 further includes a second power interface, and the central controller 12 receives power supply through the second power interface.

Signals exchanged between the central controller 12 and the four wheel end controllers 133 include active bit signals of the wheel end controllers 133 and an active bit signal of the central controller 12. The active bit signal of the wheel end controller 133 indicates whether the wheel end controller 133 is active or fails. The active bit signal of the central controller 12 indicates whether the central controller 12 is active or fails.

The central controller 12 may also monitor a state of the central controller 12 and generate the active bit signal of the central controller 12. When the central controller 12 can work normally, the active bit signal of the central controller 12 output by the central controller 12 indicates an active state of the central controller 12. When the central controller 12 cannot work normally, for example, a board is faulty or a power supply is faulty, the active bit signal of the central controller 12 output by the central controller 12 indicates a failed state of the central controller 12, indicating that the central controller 12 currently cannot work normally. Similarly, the central controller 12 sends the active bit signal of the central controller 12 to the central the four wheel end controllers 133, so that the four wheel end controllers 133 obtain the current active state of the central controller 12.

In addition, each wheel end controller 133 may also monitor a state of the wheel end controller 133 and generate an active bit signal of the wheel end controller 133. When the wheel end controller 133 can work normally, the active bit signal of the wheel end controller 133 output by the wheel end controller 133 indicates an active state of the wheel end controller 133. When the wheel end controller 133 cannot work normally, for example, a board is faulty or a power supply is faulty, the active bit signal of the wheel end controller 133 output by the wheel end controller 133 indicates a failed state of the wheel end controller 133, indicating that the wheel end controller 133 currently cannot work normally. Each wheel end controller 133 may send the active bit signal of the wheel end controller 133 to the central controller 12 and another wheel end controller 133, and the central controller 12 and the wheel end controller 133 determine working states of the four wheel end controllers 133 based on the active bit signal of each wheel end controller 133.

The signals exchanged between the central controller 12 and the four wheel end controllers 133 also include an activeness signal of the brake pedal travel sensor and an activeness signal of the brake pedal force sensor. The activeness signal of the brake pedal travel sensor indicates whether the brake pedal travel sensor is active or fails. The activeness signal of the brake pedal force sensor indicates whether the brake pedal force sensor is active or fails.

When the brake pedal travel sensor works normally, a first brake force corresponding to the channel of brake pedal travel signal and a third brake force corresponding to the other channel of brake pedal travel signal should be basically the same. However, if a difference between the first brake force and the third brake force is greater than a preset threshold, the activeness signal of the brake pedal force sensor indicates that the brake pedal travel sensor fails.

When the brake pedal force sensor works normally, a second brake force corresponding to the channel of brake pedal travel signal and a fourth brake force corresponding to the other channel of brake pedal force signal should be basically the same. However, if a difference between the second brake force and the fourth brake force is greater than the preset threshold, the activeness signal of the brake pedal force sensor indicates that the brake pedal force sensor fails.

For example, the central controller 12 shown in FIG. 3 receives one channel of brake pedal travel signal from the brake pedal travel sensor and one channel of brake pedal force signal from the brake pedal force sensor, and a wheel end controller 133 receives the other channel of brake pedal travel signal from the brake pedal travel sensor and the other channel of brake pedal force signal from the channel of brake pedal force sensor. The central controller 12 may determine, based on the channel of brake pedal travel signal transmitted from the brake pedal travel sensor, whether the brake pedal travel sensor is active, and output the activeness signal of the brake pedal travel sensor, or determine, based on the channel of brake pedal travel signal transmitted from the brake pedal travel sensor, whether the brake pedal force sensor is active, and output the activeness signal of the brake pedal force sensor.

When the brake pedal travel sensor cannot monitor the motion state of the brake pedal 11 or the central controller 12 cannot receive the channel of brake pedal travel signal, the activeness signal of the brake pedal travel sensor sent by the central controller indicates a failed state. When the brake pedal force sensor cannot monitor the force acting on the brake pedal 11 or the central controller 12 cannot receive the channel of brake pedal force signal, the activeness signal of the brake pedal force sensor sent by the central controller indicates a failed state.

Optionally, when the central controller 12 fails, the central controller 12 cannot communicate with the four wheel end controllers 133. In other words, when the four wheel end controllers 133 cannot receive signals from the central controller 12, the four wheel end controllers 133 determine that the central controller 12 has failed. Similarly, when the central controller 12 cannot receive signals from the four wheel end controllers 133, the central controller 12 determines that the four wheel end controllers 133 have failed.

Figure 9:
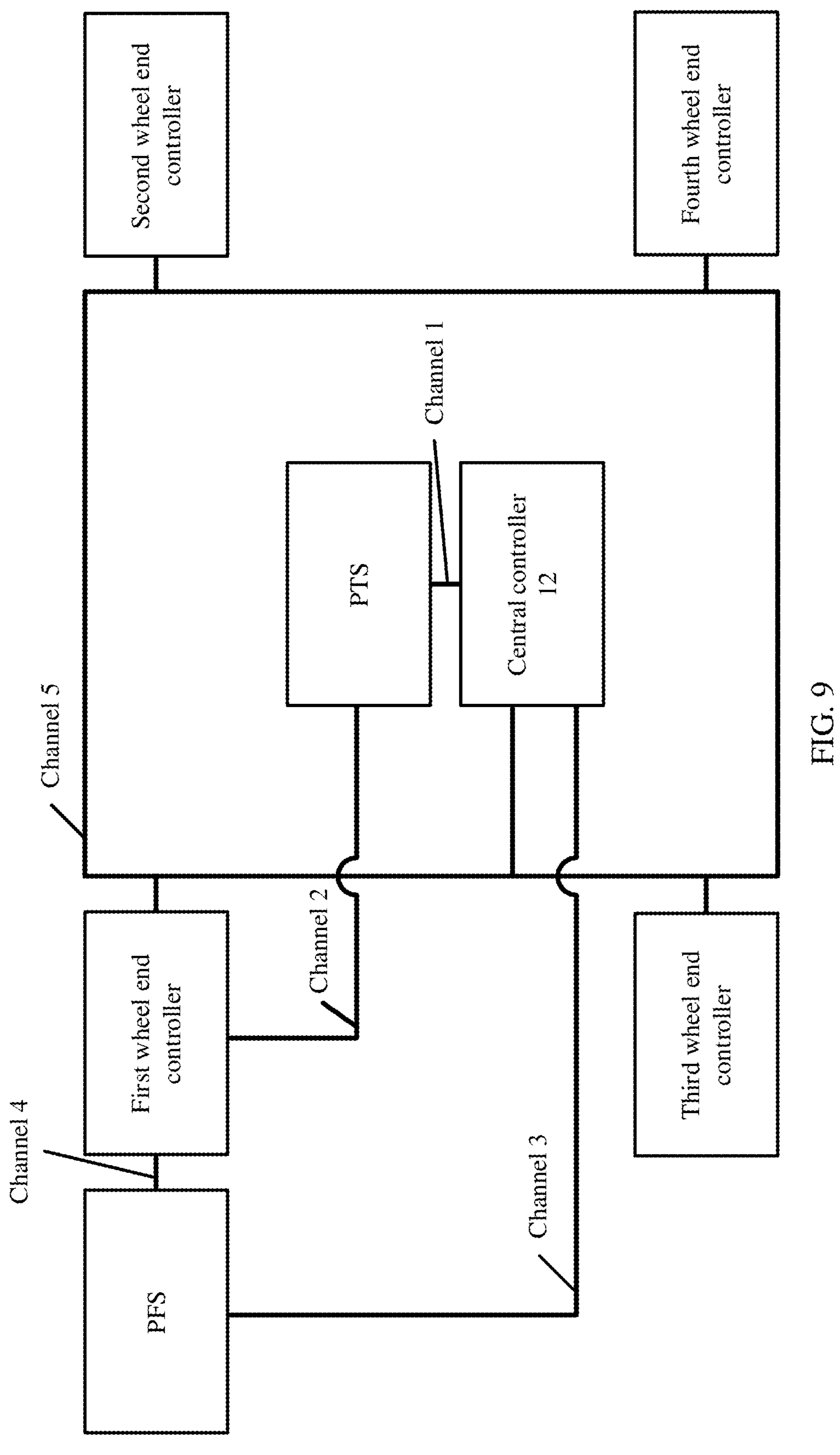
FIG. 9 is a signal transmission diagram of a brake system with control redundancy according to an embodiment.

FIG. 9 is a signal transmission diagram of the brake system 300 with control redundancy according to an embodiment. As shown in FIG. 9, the pedal travel sensor and the central controller 12 transmit a signal to each other through a channel 1. For example, after collecting a travel distance of the brake pedal, the brake pedal travel sensor sends the channel of brake pedal travel signal to the central controller 12 through the channel 1. The pedal travel sensor and a first wheel end controller transmit a signal to each other through a channel 2. For example, after collecting a travel distance of the brake pedal, the brake pedal travel sensor sends the other channel of brake pedal travel signal to the first wheel end controller through the channel 2.

The brake pedal force sensor and the central controller 12 transmit a signal to each other through a channel 3. For example, after collecting a force acting on the brake pedal, the brake pedal force sensor sends the channel of brake pedal force signal to the central controller 12 through the channel 3. The brake pedal force sensor and the first wheel end controller transmit a signal to each other through a channel 4. For example, after collecting a force acting on the brake pedal, the brake pedal force sensor sends the other channel of brake pedal force signal to the first wheel end controller through the channel 4.

The central controller 12 communicates with the four wheel end controllers 133 through a channel 5. Signals sent by the wheel end controller 133 to the central controller 12 through the channel 5 include a wheel end state signal, the active bit signal of the wheel end controller 133, and the like. The wheel end state signal indicates a current state of the wheel end brake apparatus 13, and includes a temperature of the brake motor 1311, a position of a rotor of the brake motor 1311, a clamping force output by the brake actuator 131, and the like. The active bit signal of the wheel end controller 133 indicates an active state or a failed state of the wheel end controller 133.

The channel 1, the channel 2, the channel 3, the channel 4, and the channel 5 in the foregoing embodiment are signal transmission paths. Specific forms of the channels depend on a connection manner between modules, for example, an electrical connection or a CAN bus connection commonly.

In the brake system 300 with control redundancy provided in this embodiment, both the brake pedal travel sensor and the brake pedal force sensor are disposed. The brake pedal travel sensor and the brake pedal force sensor each are connected to the central controller 12 and one wheel end controller 133, to implement a redundancy design of the brake system 300 with control redundancy. The brake system 300 with control redundancy provided in this embodiment can still provide stable control for the four wheel end brake apparatuses 13 when a single-point failure occurs in the brake pedal travel sensor and the brake pedal force sensor, so that the four wheel end brake apparatuses 13 provide correct brake forces, to improve brake safety and reliability of the electric vehicle 01.

Based on different failure situations of the brake pedal travel sensor, the brake pedal force sensor, the central controller 12, and one of the four wheel end controllers 133, the brake system 300 with control redundancy provided in this embodiment also has corresponding different operating modes, to ensure that the brake system 300 with control redundancy can work reliably. In addition, when the brake pedal travel sensor and the brake pedal force sensor work normally at the same time, whether the brake pedal is seized may be further determined by using the two channels of brake pedal travel signals output by the brake pedal travel sensor and the two channels of brake pedal force signals output by the brake pedal force sensor, to avoid a case in which a driver cannot control the vehicle.

The following describes different working modes of the brake system 300 with control redundancy in detail with reference to specific embodiments.

I. Normal Working Mode

When the two channels of brake pedal travel signals, the two channels of brake pedal force signals, the central controller 12, and the first wheel end controller are all active, the brake system 300 with control redundancy is in the normal working mode. In this case, an active bit signal of the central controller 12, an active bit signal of the brake pedal travel sensor, and an active bit signal of the brake pedal force sensor output by the central controller 12 all indicate active states. An active bit signal of the wheel end controller 133, an active bit signal of the brake pedal travel sensor, and an active bit signal of the brake pedal force sensor output by the first wheel end controller all also indicate active states. In this case, the central controller 12 controls, based on a larger value in the first brake force corresponding to the channel of brake pedal travel signal and the second brake force corresponding to the channel of brake pedal force signal, the four wheel end brake apparatuses 13 to output brake forces.

When the two channels of brake pedal travel signals, the two channels of brake pedal force signals, the central controller 12, and the first wheel end controller are all active, the central controller 12 executes a main control function. In this case, the central controller 12 calculates the first brake force based on the channel of brake pedal travel signal, and the central controller 12 calculates the second brake force based on the channel of brake pedal force signal. The central controller 12 calculates the third brake force based on the other channel of brake pedal travel signal, and the central controller 12 calculates the fourth brake force based on the other channel of brake pedal force signal. The central controller 12 controls, based on a largest value in the first brake force, the second brake force, the third brake force, and the fourth brake force, the four wheel end brake apparatuses 13 to output brake forces, then distributes brake forces based on the largest value in the first brake force, the second brake force, the third brake force, and the fourth brake force, to obtain a brake force that each wheel end brake apparatus 13 needs to output, and outputs brake control signals. In response to the brake control signal, the control circuit 1331 in the wheel end controller 133 controls the brake motor power circuit 1332 to output a driving current of the corresponding brake motor 1311, to drive the brake motor 1311 to output a brake torque. Then, the brake motor 1311 drives the brake actuator 131 to clamp the brake disc 14 of the electric vehicle, to output a brake force indicated by the brake control signal. After the wheel end brake apparatus 13 outputs the brake force based on an indication of the central controller 12, the wheel end controller 133 sends an execution status of the wheel end brake apparatus 13 to the central controller 12. The execution status of the wheel end brake apparatus 13 includes a clamping force output by the brake caliper 1312, a torque output by the brake motor 1311, a temperature of the brake motor 1311, and the like.

The central controller 12 controls, based on the channel of brake pedal travel signal and the channel of brake pedal force signal, the four wheel end brake apparatuses 13 to output brake forces. This improves brake accuracy during braking, and avoids insufficient output brake forces due to inaccurate measurement of the brake pedal travel sensor or the brake pedal force sensor.

Figure 10:
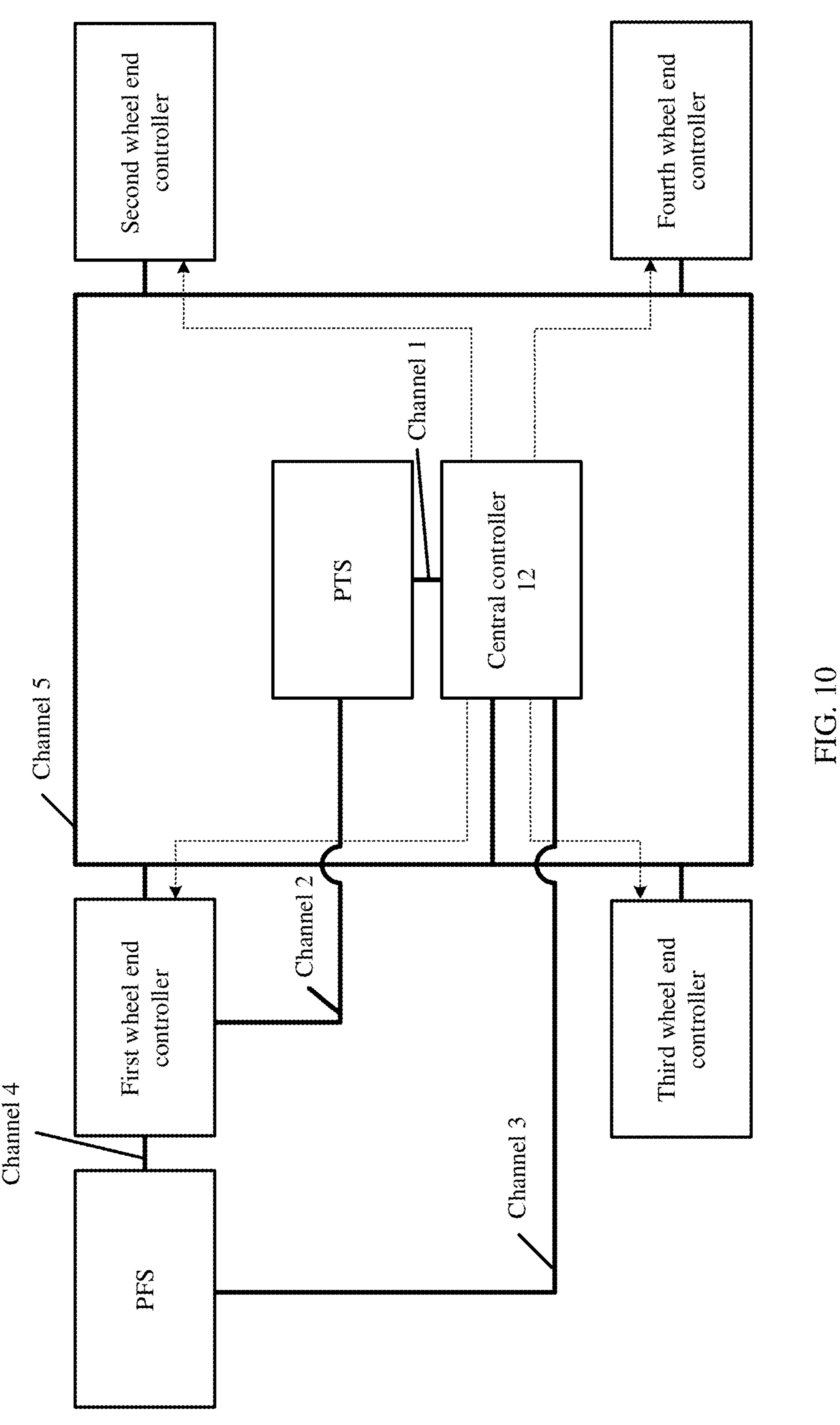
FIG. 10 is a signal transmission diagram of a brake system with control redundancy in a normal working mode.

FIG. 10 is a signal transmission diagram of the brake system with control redundancy in the normal working mode. In the normal mode, the central controller 12 transmits a brake request signal to the four wheel end controllers 133 through the channel 5, and the brake request signal is used to control the four wheel end brake apparatuses 13 to output brake forces.

II. Working Mode with a Single-Point Failure

The single-point failure is a failure of one of the brake pedal travel signals (including a failure of one channel and failures of the two channels), the brake pedal force signals (including a failure of one channel and failures of the two channels), the central controller 12, and the first wheel end controller. In this case, the brake system 300 with control redundancy still retains a part of a capability of monitoring the motion state of the brake pedal or a part of a control capability, to ensure that the brake system 300 with control redundancy continues to work normally. For example, the following describes specific situations of a single-point failure and a corresponding control manner in detail with reference to specific embodiments.

1. The Brake Pedal Travel Signals Fail

Figure 11:
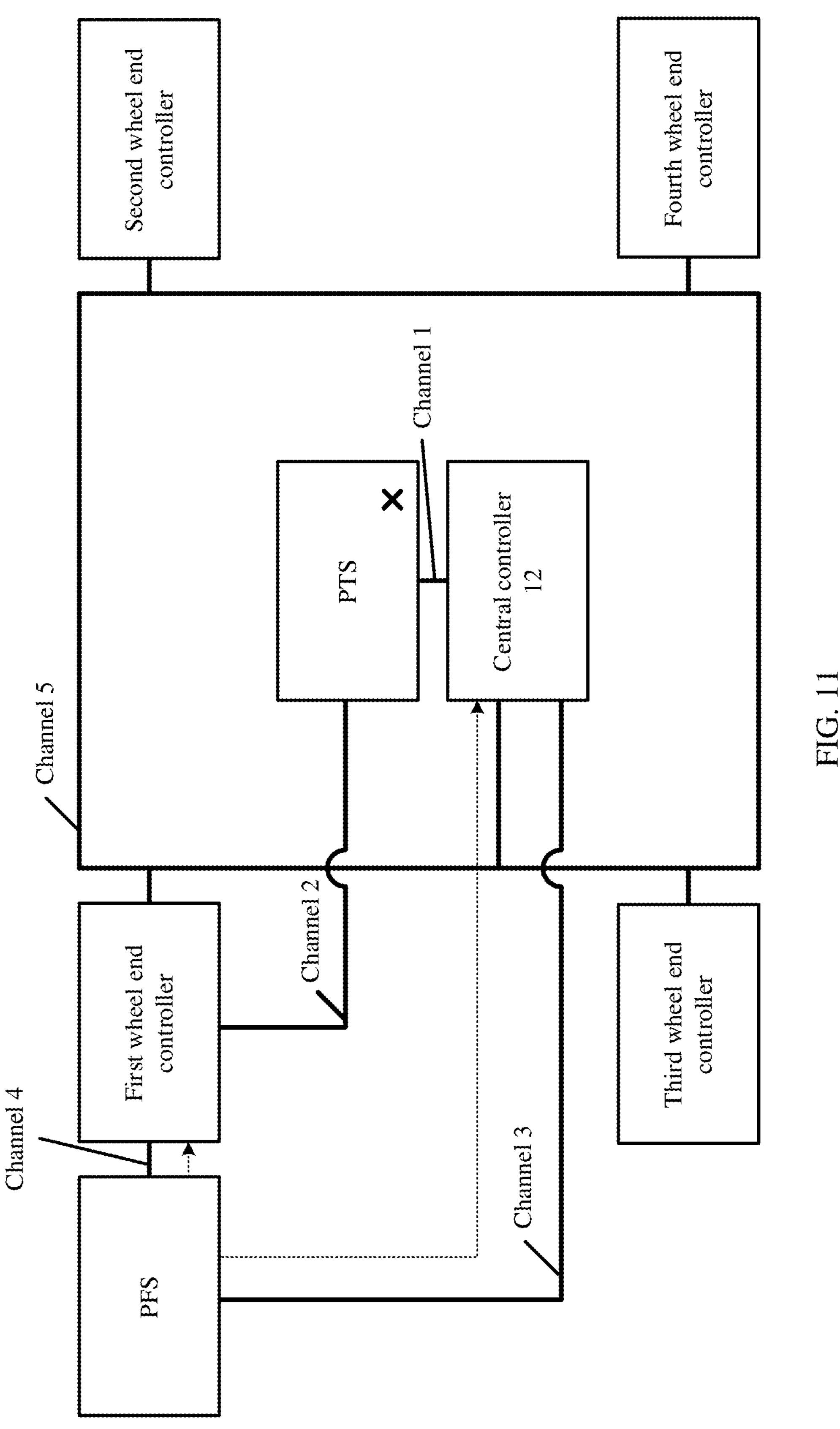
FIG. 11 is a signal transmission diagram 1 of a brake system with control redundancy in a case in which brake pedal travel signals fail.

When the brake pedal travel sensor fails, the two channels of brake pedal travel signals both fail, and the central controller 12 controls, based on the second brake force corresponding to the channel of brake pedal force signal, the four wheel end brake apparatuses 13 to output brake forces. Alternatively, the central controller 12 may obtain the other channel of brake pedal force signal from the first wheel end controller, and the central controller 12 may control, based on a larger value in the second brake force corresponding to the channel of brake pedal force signal and the fourth brake force corresponding to the other channel of brake pedal force signal, the four wheel end brake apparatuses 13 to output brake forces. FIG. 11 is a diagram of a communication architecture in a case in which the brake pedal travel sensor fails is shown in.

Figure 12:
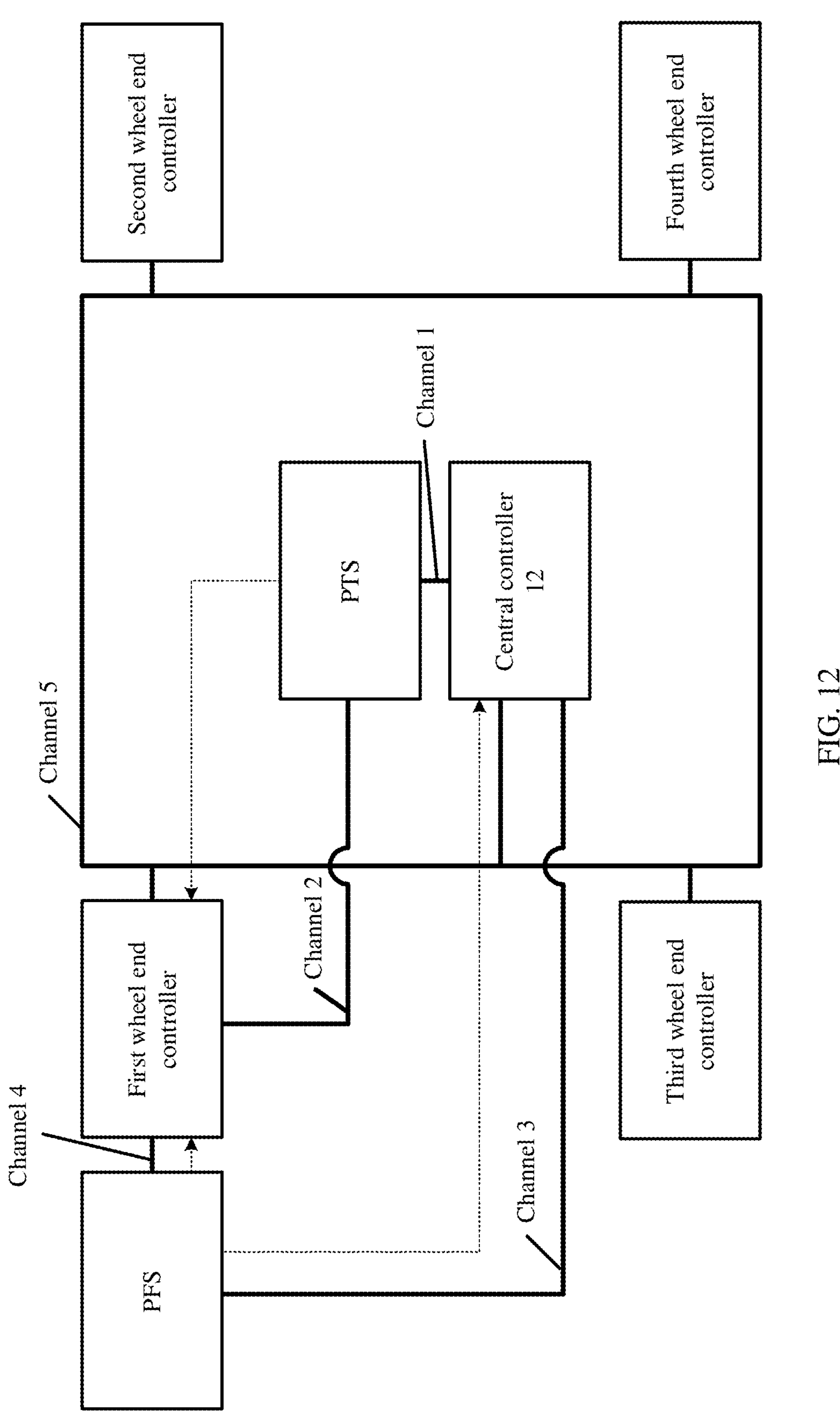
FIG. 12 is a signal transmission diagram 2 of a brake system with control redundancy in a case in which a brake pedal travel signal fails.

When the first power supply unit 701 in the central controller fails, the channel of brake pedal travel signal originally sent to the central controller 12 cannot be sent because one channel of power supply to the brake pedal travel sensor is lost. In this case, the central controller 12 controls, based on the second brake force corresponding to the channel of brake pedal force signal, the four wheel end brake apparatuses 13 to output brake forces. Alternatively, the central controller 12 may obtain the other channel of brake pedal travel signal and the other channel of brake pedal force signal from the first wheel end controller, and the central controller 12 may control, based on a largest value in the second brake force corresponding to the channel of brake pedal force signal, the third brake force corresponding to the other channel of brake pedal travel signal, and the fourth brake force corresponding to the other channel of brake pedal force signal, the four wheel end brake apparatuses 13 to output brake forces. FIG. 12 is a diagram of a communication architecture in a case in which a power supply failure occurs.

Figure 13:
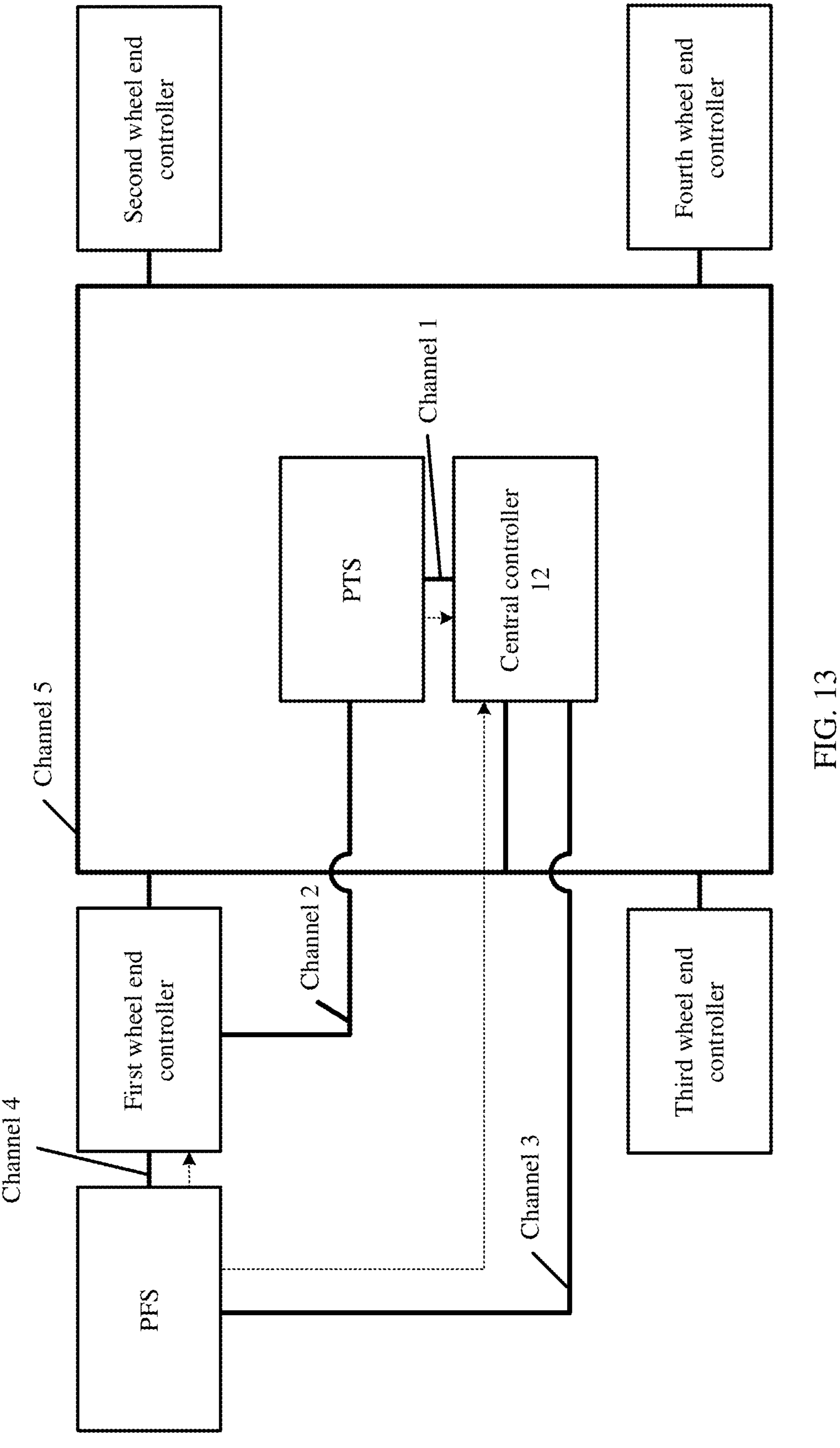
FIG. 13 is a signal transmission diagram 3 of a brake system with control redundancy in a case in which a brake pedal travel signal fails.

When the second power supply unit 801 in the central controller fails, the other channel of brake pedal travel signal originally sent to the first wheel end controller cannot be sent because the other channel of power supply to the brake pedal travel sensor is lost. In this case, the central controller 12 controls, based on a larger value in the first brake force corresponding to the channel of brake pedal travel signal and the second brake force corresponding to the channel of brake pedal force signal, the four wheel end brake apparatuses 13 to output brake forces. Alternatively, the central controller 12 may obtain the other channel of brake pedal force signal from the first wheel end controller, and the central controller 12 controls, based on a largest value in the first brake force corresponding to the channel of brake pedal travel signal, the second brake force corresponding to the channel of brake pedal force signal, and the fourth brake force corresponding to the other channel of brake pedal force signal, the four wheel end brake apparatuses 13 to output brake forces. FIG. 13 is a diagram of a communication architecture in a case in which a power supply failure occurs.

2. The Brake Pedal Travel Signals Fail

Figure 14:
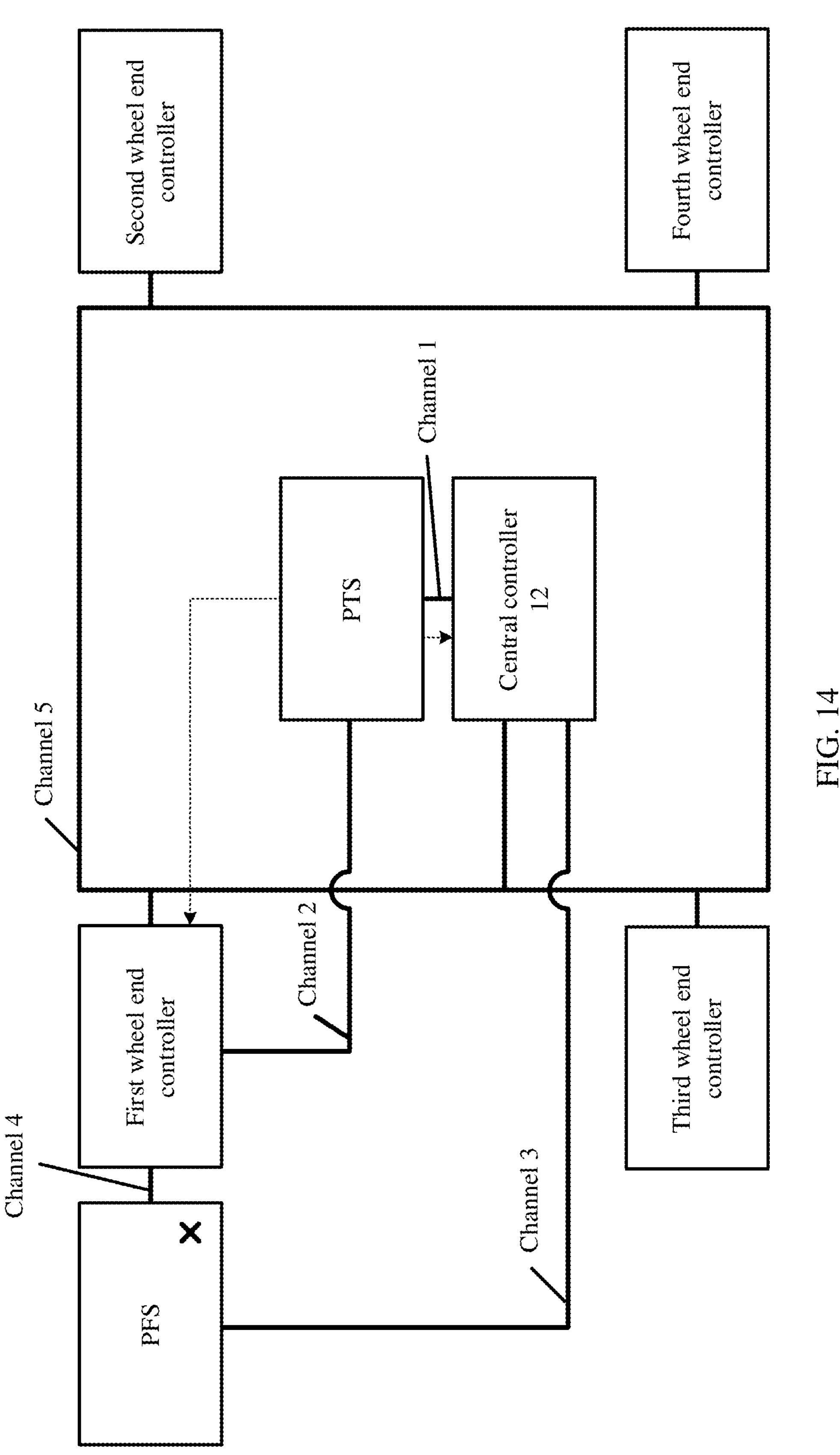
FIG. 14 is a signal transmission diagram of a brake system with control redundancy in a case in which brake pedal force signals fail.

When the brake pedal force sensor fails, the two channels of brake pedal force signals both fail, and the central controller 12 controls, based on the first brake force corresponding to the channel of brake pedal travel signal, the four wheel end brake apparatuses 13 to output brake forces. Alternatively, the central controller 12 may obtain the other channel of brake pedal travel signal from the first wheel end controller, and the central controller 12 may control, based on a larger value in the first brake force corresponding to the channel of brake pedal force signal and the third brake force corresponding to the other channel of brake pedal travel signal, the four wheel end brake apparatuses 13 to output brake forces. FIG. 14 is a diagram of a communication architecture in a case in which the brake pedal force sensor fails.

When the third power supply unit 802 in the central controller fails, the brake pedal force sensor cannot send the two channels of brake pedal force signals because power supply to the brake pedal force sensor is lost. An action performed by the central controller 12 is the same as an action performed by the brake pedal force sensor when the brake pedal force sensor fails, and details are not described herein again.

3. The Central Controller 12 Fails

Figure 15:
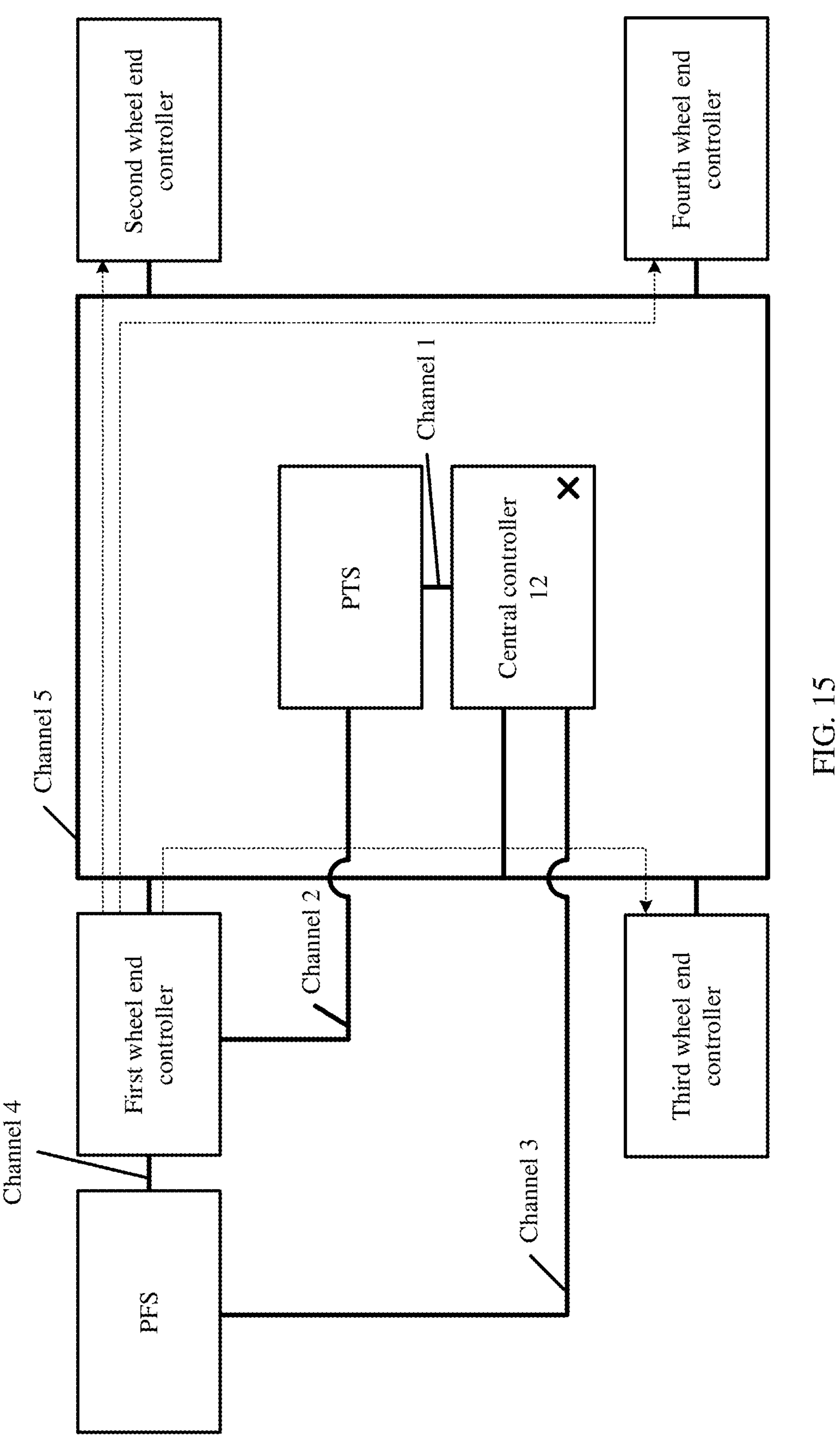
FIG. 15 is a signal transmission diagram of a brake system with control redundancy in a case in which a central controller fails.

When the central controller 12 fails, the first wheel end controller controls, based on a larger value in the third brake force corresponding to the other channel of brake pedal travel signal and the fourth brake force corresponding to the other channel of brake pedal force signal, the four wheel end brake apparatuses 13 to output brake forces. FIG. 15 is a diagram of a communication architecture in a case in which the central controller fails.

III. Working Mode with a Dual-Point or Multi-Point Failure

The dual-point or multi-point failure means a working mode in which neither the central controller 12 nor the first wheel end controller can accurately output a brake request signal. In this case, to ensure brake safety, the four wheel end brake apparatuses 13 each need to output a fixed brake force to ensure brake safety of the electric vehicle 01.

When the brake pedal signals output by the brake pedal travel sensor or the brake pedal force sensor all fail but the central controller 12 is active, the central controller 12 is configured to control the four wheel end brake apparatuses 13 to output fixed brake forces.

1. Both the Brake Pedal Travel Sensor and Brake Pedal Force Sensor Fail

When both the brake pedal travel sensor and the brake pedal force sensor fail, it is difficult to determine, based on a travel of the brake pedal, brake forces that the four wheel end brake apparatuses 13 need to be controlled to output. In this case, the central controller 12 controls the four wheel end brake apparatuses 13 to output large fixed brake forces, to ensure brake safety. The fixed brake force may be set by a person skilled in the art according to a specific situation. For example, the fixed brake force is a brake force corresponding to a pedal opening greater than 50%. The fixed brake force may be stored in the central controller 12 in a form of a number. When both the brake pedal travel sensor and the brake pedal force sensor fail, the central controller 12 may invoke the stored fixed brake force to control the four wheel end brake apparatuses 13 to output the fixed brake forces.

Figure 16:
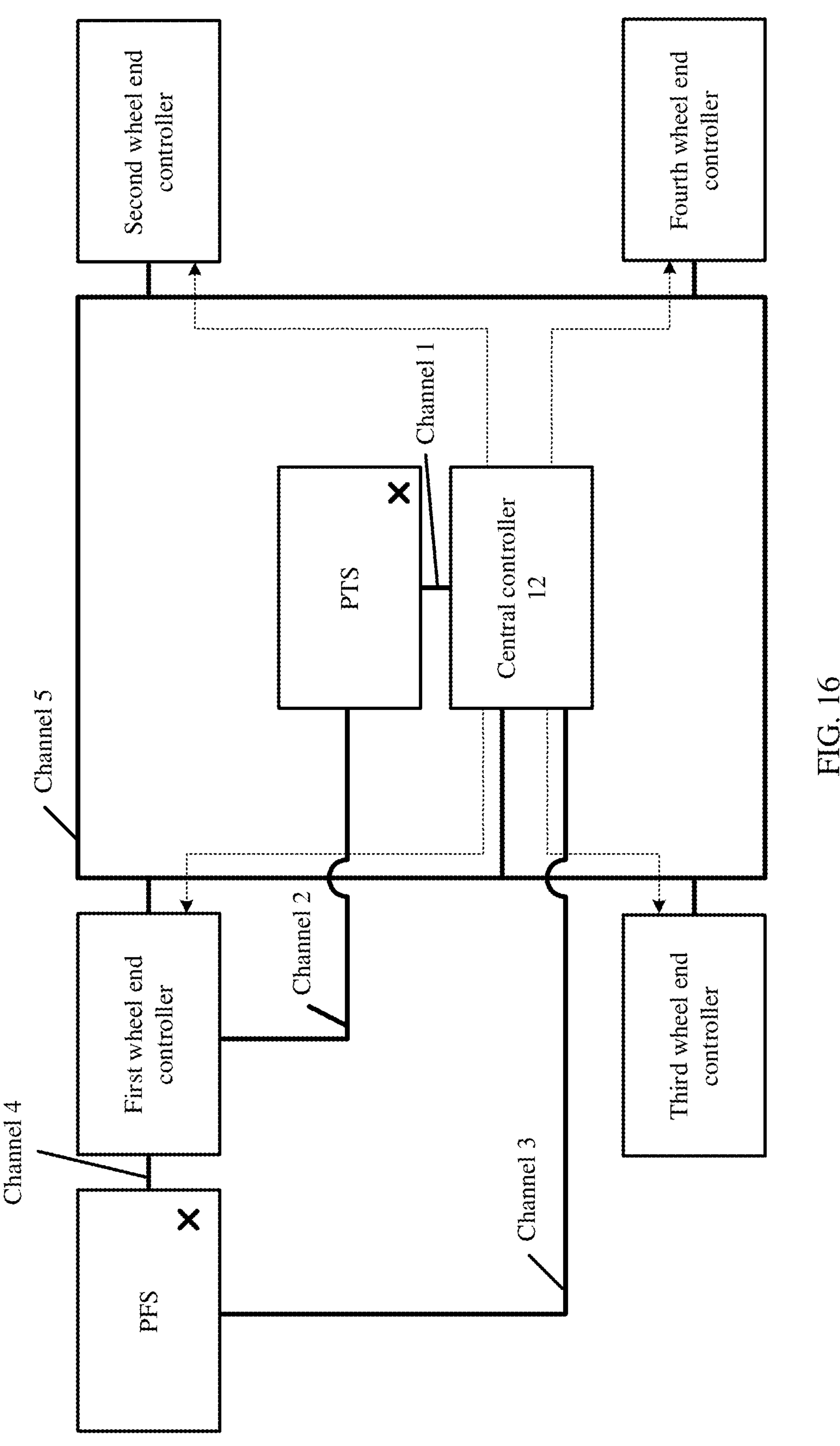
FIG. 16 is a signal transmission diagram of a brake system with control redundancy in a case in which sensors all fail.

FIG. 16 is a diagram of a communication architecture of the brake system 300 with control redundancy in a case in which both the brake pedal travel sensor and the brake pedal force sensor fail.

2. The Brake Pedal Travel Sensor, the Brake Pedal Force Sensor, and the Central Controller 12 all Fail When the brake pedal travel sensor, the brake pedal force sensor, and the central controller 12 all fail, the first wheel end controller controls the four wheel end brake apparatuses 13 to output large fixed brake forces.

Figure 17:
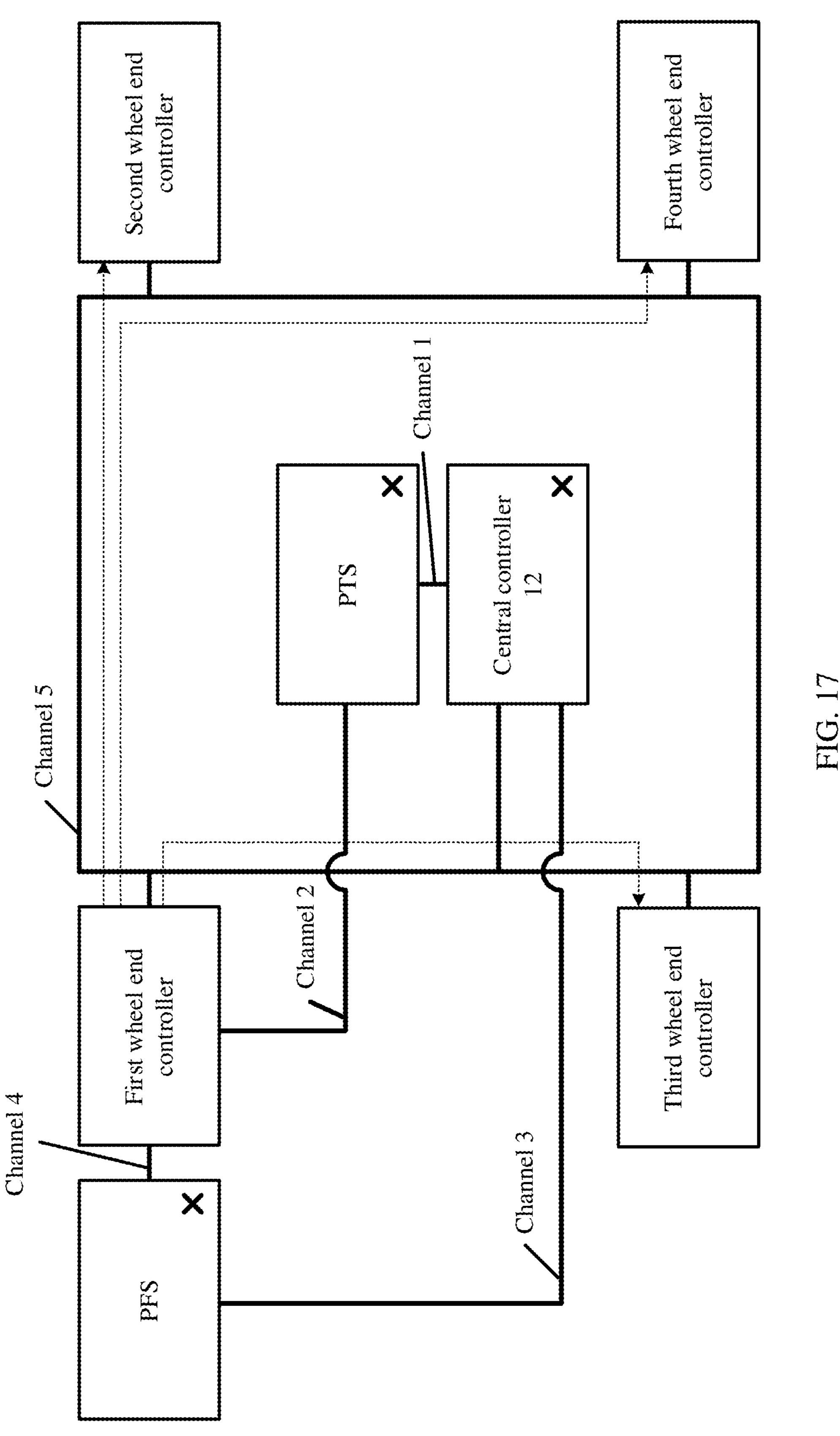
FIG. 17 is a signal transmission diagram of a brake system with control redundancy in a case in which sensors and a central controller all fail.

FIG. 17 is a diagram of a communication architecture of the brake system 300 with control redundancy in a case in which the brake pedal travel sensor, the brake pedal force sensor, and the central controller 12 all fail.

It can be understood from the foregoing analysis that, when the brake pedal travel sensor and the brake pedal force sensor fail, or the central controller 12 also fails, the brake system 300 with control redundancy provided in this embodiment may output a fixed brake force to control the electric vehicle 01 to stop. This avoids out-of-control of the electric vehicle 01, and further improves safety and reliability of the brake system and the electric vehicle.

IV. Working Mode in which the Brake Pedal is Seized

When the electric vehicle 01 is in a braking state, the brake pedal may be seized. If the brake pedal is stuck or seized, the driver may be unable to complete stopping. In addition, if the brake pedal is seized, it may be difficult for the electric vehicle 01 to slow down. If the electric vehicle 01 is unable to slow down, this may lead to out-of-control of the electric vehicle 01. In addition, if the brake pedal is stuck in a position for a long period of time, it may cause prolonged contact between the brake disc 14 of the electric vehicle 01 and the brake caliper 1312. Consequently, the wheel end brake apparatus 13 is overheated, and the overheated wheel end brake apparatus 13 is prone to failure. This causes a safety hazard. In addition, the stuck or seized brake pedal may further cause a misoperation of the driver, and an operation of jamming on the brake pedal or releasing the brake pedal. These operations easily lead to an accident.

Therefore, when the electric vehicle 01 is in the braking state, the central controller 12 is configured to: when a brake pedal travel variation indicated by the channel of brake pedal travel signal is less than a preset travel and a force that acts on the brake pedal and that is indicated by the channel of brake pedal force signal is greater than a preset force, determine that the brake pedal is in a seized state. The preset travel may be set by a person skilled in the art based on a specific situation. A brake pedal travel detected by the brake pedal travel sensor does not change when the brake pedal is stuck in a position. Therefore, the channel of brake pedal travel signal does not change while the driver is still stepping on the brake pedal force sensor. In this case, the brake pedal force sensor detects that the force acting on the brake pedal changes. Therefore, the channel of brake pedal force signal changes. In this case, the central controller 12 may determine, based on the channel of received brake pedal travel signal and the channel of brake pedal force signal, whether the brake pedal is in the seized state, and output an indication signal indicating that the brake pedal is seized.

Figure 18:
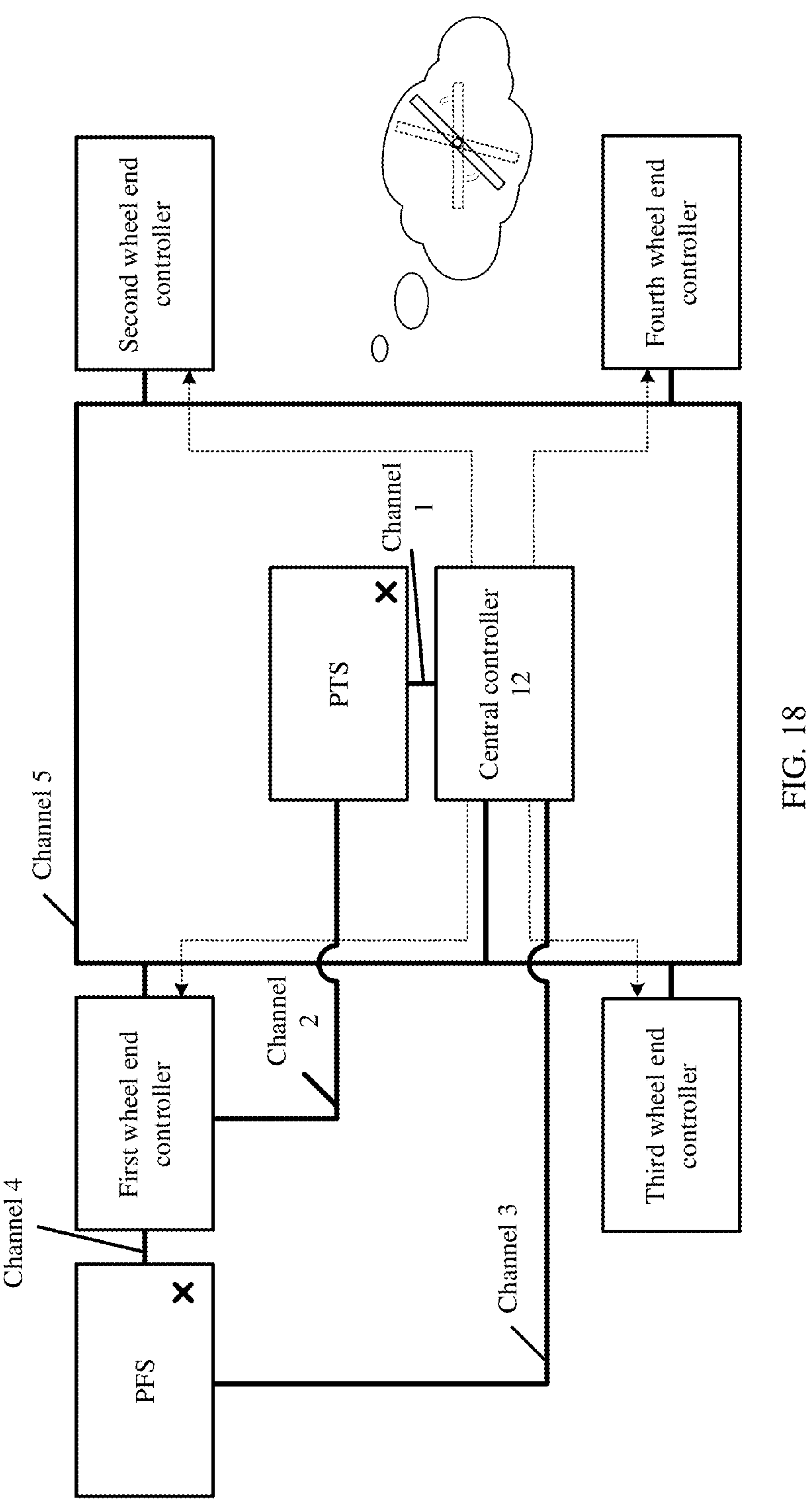
FIG. 18 is a signal transmission diagram of a brake system with control redundancy in a case in which a brake pedal is seized.

FIG. 18 may further show a diagram of a communication architecture of the brake system 300 with control redundancy in a case in which the brake pedal is seized.

In addition, because the brake pedal is in the seized state, the brake force corresponding to the brake pedal travel detected by the brake pedal travel sensor cannot correctly control the four wheel end brake apparatuses 13. In this case, the central controller 12 controls, based on the second brake force corresponding to the channel of brake pedal force signal, the four wheel end brake apparatuses 13 to output brake forces.

In addition, the first wheel end controller may also detect whether the brake pedal is seized. The first wheel end controller is configured to: when a brake pedal travel variation indicated by the other channel of brake pedal travel signal is less than the preset travel and a force that acts on the brake pedal and that is indicated by the other channel of brake pedal force signal is greater than the preset force, determine that the brake pedal is in the seized state. In addition, because the brake pedal is in the seized state, the brake force corresponding to the brake pedal travel detected by the brake pedal travel sensor cannot correctly control the four wheel end brake apparatuses 13. In this case, if the central controller 12 fails, the first wheel end controller may control, based on the fourth brake force corresponding to the other channel of brake pedal force signal, the four wheel end brake apparatuses 13 to output brake forces.

With reference to the foregoing analysis, it can be understood that the brake system 300 with control redundancy provided in this embodiment can determine, based on the brake pedal travel signal output by the brake pedal travel sensor and the brake pedal force signal output by the brake pedal force sensor, whether the brake pedal is in the seized state, to avoid a safety risk and improve driving safety.

Figure 19:
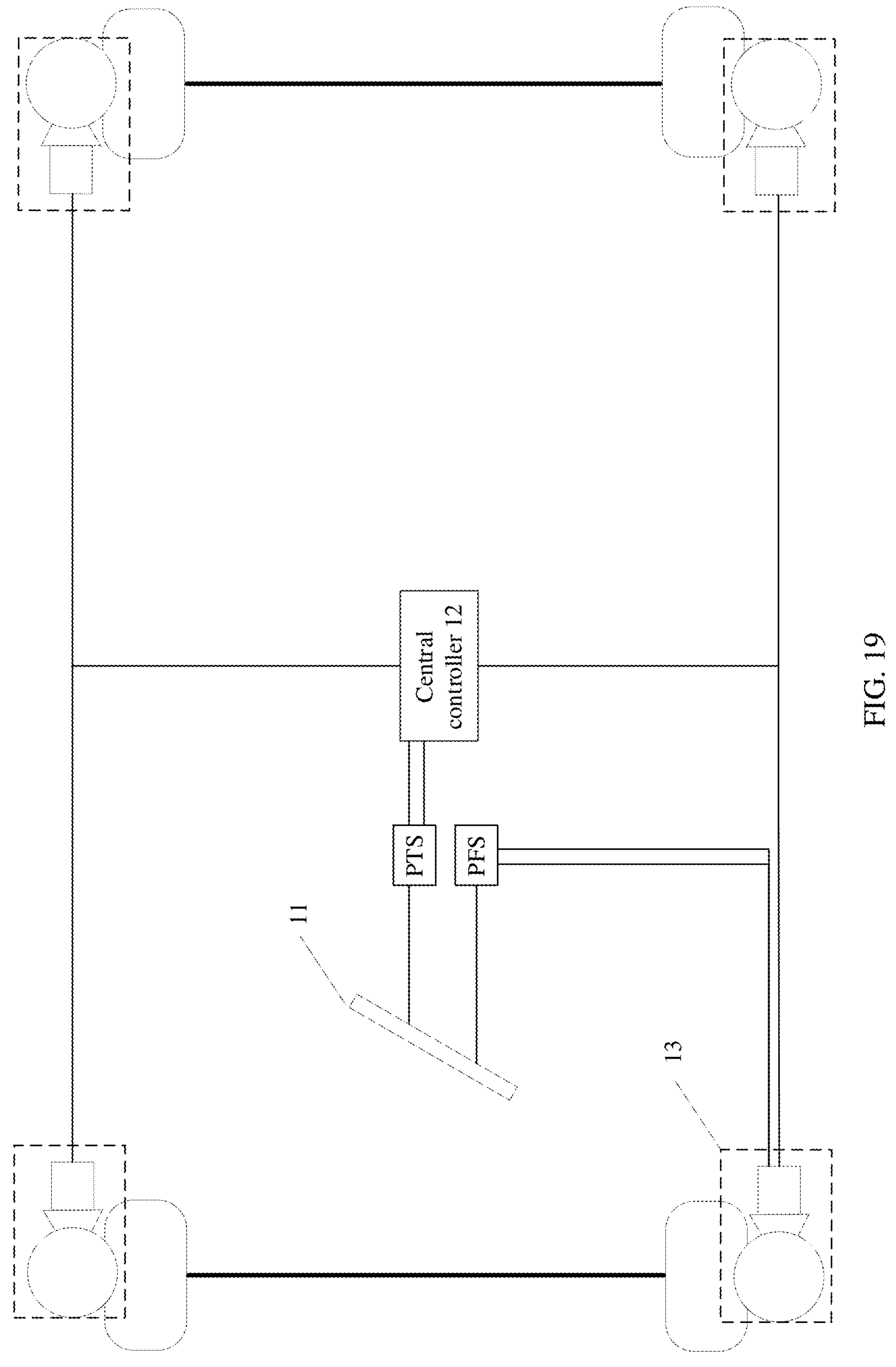
FIG. 19 is a diagram of another brake system with control redundancy according to an embodiment.

In addition, based on a same concept, the embodiments further provide another brake system with control redundancy. Refer to FIG. 19. The central controller 12 is connected to the brake pedal travel sensor. One of the four wheel end controllers 133 is connected to the brake pedal force sensor. The brake pedal travel sensor is configured to output two channels of brake pedal travel signals, and the brake pedal force sensor is configured to output two channels of brake pedal force signals. For various manners of controlling the four wheel end brake apparatuses 13 to output brake forces in this architecture, refer to the foregoing embodiment. Details are not described herein again.

Although described with reference to specific features and embodiments thereof, it is clear that various modifications and combinations may be made to them without departing from their scope. Correspondingly, the embodiments and accompanying drawings are merely example descriptions, and are considered as any of or all modifications, variations, combinations, or equivalents that cover the scope of the embodiments.

It is clear that a person skilled in the art can make various modifications and variations to the embodiments without departing from their scope. The embodiments cover these modifications and variations.

The invention claimed is:

1. A brake system comprising:

a central controller configured to receive a first channel of a brake pedal travel signal from a brake pedal travel sensor and a first channel of a brake pedal force signal from a brake pedal force sensor; and four wheel end brake apparatuses, wherein each wheel end brake apparatus of the wheel end brake apparatuses comprises a wheel end controller and a brake actuator, the wheel end controller is configured to control the brake actuator to output a brake force to a brake disc of a vehicle; one wheel end controller of the four wheel end controllers is configured to receive a second channel of the brake pedal travel signal from the brake pedal travel sensor and a second channel of the brake pedal force signal from the brake pedal force sensor, the first channel of the brake pedal travel signal and the second channel of the brake pedal travel signal indicate a travel distance of a brake pedal, and the first channel of the brake pedal force signal and the second channel of the brake pedal force signal indicate a force acting on the brake pedal.

2. The brake system according to claim 1, wherein a brake force corresponding to the first channel of the brake pedal travel signal is a first brake force, a brake force corresponding to the second channel of the brake pedal travel signal is a second brake force;

a brake force corresponding to the first channel of the brake pedal force signal is a third brake force, and a brake force corresponding to the second channel of the brake pedal force signal is a fourth brake force.

3. The brake system according to claim 2, wherein during braking of the vehicle, the central controller is further configured to:

in response to both the brake pedal travel sensor and the brake pedal force sensor being active, control, based on a larger value in the first brake force and the second brake force, the four wheel end brake apparatuses to output brake forces that control the four wheel ends, or control, based on a largest value in the first brake force, the second brake force, the third brake force, and the fourth brake force, the brake apparatuses to output the brake forces that control the four wheel ends.

4. The brake system according to claim 2, wherein the central controller is further configured to:

in response to the brake pedal travel sensor being active and the brake pedal force sensor failing, control, based on the first brake force, the four wheel end brake apparatuses to output brake forces; or in response to the brake pedal travel sensor failing and the brake pedal force sensor being active, control, based on the second brake force, the four wheel end brake apparatuses to output the brake forces.

5. The brake system according to claim 4, wherein the central controller is further configured to:

in response to a difference between the first brake force and the third brake force being greater than a preset threshold, output a first failure signal, wherein the first failure signal indicates that the brake pedal travel sensor fails; or in response to a difference between the second brake force and the fourth brake force being greater than the preset threshold, output a second failure signal, wherein the second failure signal indicates that the brake pedal force sensor fails.

6. The brake system according to claim 4, wherein during braking of the vehicle, the central controller is further configured to:

in response to a difference between the first brake force and the third brake force being greater than a preset threshold, control, based on a larger value in the second brake force and the fourth brake force, the four wheel end brake apparatuses to output brake forces; or in response to a difference between the second brake force and the fourth brake force being greater than the preset threshold, control, based on a larger value in the first brake force and the third brake force, the four wheel end brake apparatuses to output the brake forces.

7. The brake system according to claim 2, wherein during braking of the vehicle, one of the four wheel end controllers is further configured to:

in response to the central controller failing and both the brake pedal travel sensor and the brake pedal force sensor being active, control, based on a larger value in the third brake force and the fourth brake force, the four wheel end brake apparatuses to output brake forces.

8. The brake system according to claim 1, wherein one of the four wheel end controllers is further configured to:

in response to the central controller and the brake pedal force sensor failing, control, based on the second channel of the brake pedal travel signal, the four wheel end brake apparatuses to output brake forces; or in response to the central controller and the brake pedal travel sensor failing, control, based on the brake pedal force signal, the four wheel end brake apparatuses to output the brake forces.

9. The brake system according to claim 1, wherein the central controller is further configured to:

in response to both the brake pedal travel sensor and the brake pedal force sensor failing, control the four wheel end brake apparatuses to output fixed brake forces.

10. The brake system according to claim 1, further comprising:

a fifth wheel end controller, other than the four wheel end controllers, configured to:

in response to both the central controller and the wheel end controller failing, control the four wheel end brake apparatuses to output fixed brake forces.

11. The brake system according to claim 1, wherein the central controller is further configured to:

in response to a brake pedal travel variation indicated by the first channel of the brake pedal travel signal being less than a preset travel distance and a force that acts on the brake pedal and that is indicated by the first channel of the brake pedal force signal being greater than a preset force, control, based on an indication of the brake pedal force signal, the four wheel end brake apparatuses to output brake forces.

12. The brake system according to claim 1, wherein one wheel end controller of the four wheel end controllers is configured to:

in response to a brake pedal travel variation indicated by the second channel of the brake pedal travel signal being less than the preset travel distance and a force that acts on the brake pedal indicated by the second channel of the brake pedal force signal being greater than the preset force, control, based on an indication of the brake pedal force signal, the four wheel end brake apparatuses to output brake forces.

13. The brake system according to claim 1, wherein the brake pedal travel sensor is further configured to receive a first channel of first direct current from the central controller and a second channel of first direct current from the wheel end controller, and the brake pedal force sensor is further configured to receive a first of second direct current from the wheel end controller.

14. The brake system according to claim 13, wherein the central controller further comprises:

a first power supply unit configured to provide the first direct current for the brake pedal travel sensor; and the central controller is configured to:

in response to the first power supply unit failing, control, based on the second brake force, the four wheel end brake apparatuses to output brake forces, or control, based on a largest value in the second brake force, the third brake force, and the fourth brake force, the four wheel end brake apparatuses to output the brake forces.

15. The brake system according to claim 13, wherein the wheel end controller further comprises:

a second power supply unit configured to provide the first direct current for the brake pedal travel sensor; and a third power supply unit, configured to provide the second direct current for the brake pedal force sensor; and the wheel end controller is further configured to:

in response to the central controller failing and the second power supply unit failing, control, based on the fourth brake force, the four wheel end brake apparatuses to output brake forces; or in response to the central controller failing and the third power supply unit failing, control, based on the third brake force, the four wheel end brake apparatuses to output the brake forces.

16. A brake system comprising:

a central controller configured to receive two channels of brake pedal travel signals from a brake pedal travel sensor; and four wheel end brake apparatuses, wherein each wheel end brake apparatus of the wheel end brake apparatuses comprises a wheel end controller and a brake actuator, the wheel end controller is configured to control the brake actuator to output a brake force to a brake disc of a vehicle one wheel end controller of the four wheel end controllers is configured to receive two channels of brake pedal force signals from the brake pedal force sensor; the two channels of brake pedal travel signals indicate a travel distance of a brake pedal, and the two channels of brake pedal force signals indicate a force acting on the brake pedal.

17. The brake system according to claim 16, wherein brake forces corresponding to the two channels of the brake pedal travel signals are a first brake force and a second brake force; and brake forces corresponding to the two channels of the brake pedal force signals are a third brake force and a fourth brake force.

18. The brake system according to claim 17, wherein, during braking of the vehicle, the central controller is further configured to:

in response to both the brake pedal travel sensor and the brake pedal force sensor being active, control, based on a larger value in the first brake force and the second brake force, the four wheel end brake apparatuses to output brake forces, or control, based on a largest value in the first brake force, the second brake force, the third brake force, and the fourth brake force, the four wheel end brake apparatuses to output the brake forces.

19. The brake system according to claim 17, wherein the central controller is further configured to:

in response to the brake pedal travel sensor being active and the brake pedal force sensor failing, control, based on a larger value in the first brake force and the second brake force, the four wheel end brake apparatuses to output brake forces; or in response to the brake pedal travel sensor failing and the brake pedal force sensor being active, control, based on a larger value in the third brake force and the fourth brake force, the four wheel end brake apparatuses to output the brake forces.

20. The brake system according to claim 17, wherein, during braking of the vehicle, one of the four wheel end controllers is configured to:

in response to the central controller failing, control, based on a larger value in the third brake force and the fourth brake force, the four wheel end brake apparatuses to output brake forces.

* * * * *